United States Patent
Lee et al.

(10) Patent No.: US 9,699,279 B2
(45) Date of Patent: Jul. 4, 2017

(54) HOUSING, MANUFACTURING METHOD THEREOF, AND ELECTRONIC DEVICE INCLUDING THE HOUSING

(71) Applicant: Samsung Electronics Co., Ltd., Gyeonggi-do (KR)

(72) Inventors: Yong-Seok Lee, Seoul (KR); Jin-A Mock, Gyeonggi-do (KR); Soon-Woong Yang, Gyeonggi-do (KR); Seung-Hoon Lee, Seoul (KR); Min-Su Jung, Seoul (KR); Hong-Moon Chun, Gyeonggi-do (KR); Kun-Chan Seo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 26 days.

(21) Appl. No.: 14/802,381

(22) Filed: Jul. 17, 2015

(65) Prior Publication Data

US 2016/0050302 A1 Feb. 18, 2016

(30) Foreign Application Priority Data

Aug. 12, 2014 (KR) .................. 10-2014-0104434
Aug. 29, 2014 (KR) .................. 10-2014-0114567

(51) Int. Cl.
*H04M 1/00* (2006.01)
*H04M 1/02* (2006.01)
*G06F 1/16* (2006.01)
*H04M 1/18* (2006.01)
*H04B 1/3888* (2015.01)

(52) U.S. Cl.
CPC ........ *H04M 1/0202* (2013.01); *G06F 1/1656* (2013.01); *H04B 1/3888* (2013.01); *H04M 1/185* (2013.01)

(58) Field of Classification Search
USPC ............ 455/575.1, 550.1; 174/520; 428/34.1
See application file for complete search history.

(56) References Cited

U.S. PATENT DOCUMENTS

| 6,234,593 B1 | 5/2001 | Chen et al. |
| 6,877,995 B1 * | 4/2005 | Chen .................. H05K 5/0269 361/737 |
| 7,106,580 B2 | 9/2006 | Kugimiya et al. |

(Continued)

FOREIGN PATENT DOCUMENTS

| EP | 1 555 594 | 7/2005 |
| EP | 2 530 553 | 12/2012 |

(Continued)

OTHER PUBLICATIONS

Korean Office Action dated Apr. 29, 2016 issued in counterpart application No. 10-2014-0114567, 13 pages.

(Continued)

*Primary Examiner* — David Q Nguyen
(74) *Attorney, Agent, or Firm* — The Farrell Law Firm, P.C.

(57) ABSTRACT

A mobile phone is provided, which includes a metal bezel having a left bezel portion and a right bezel portion and covering at least one part of an outer circumferential edge of a main body of the mobile phone, wherein upper and lower corner bezel portions of the left and right bezel portion are formed to be thicker outwardly in comparison with a middle portion of the left and right bezel portions.

14 Claims, 30 Drawing Sheets

(56) References Cited

U.S. PATENT DOCUMENTS

| | | | |
|---|---|---|---|
| 7,688,574 B2 | 3/2010 | Zadesky et al. | |
| 8,688,179 B2 | 4/2014 | Choo et al. | |
| 2007/0265028 A1* | 11/2007 | Jorgensen | H04M 1/0262 |
| | | | 455/550.1 |
| 2011/0291896 A1 | 12/2011 | Pascolini et al. | |
| 2012/0175165 A1 | 7/2012 | Merz et al. | |
| 2012/0213927 A1 | 8/2012 | Ohira et al. | |
| 2013/0027892 A1 | 1/2013 | Lim et al. | |
| 2014/0105762 A1 | 4/2014 | Tobe | |
| 2014/0132458 A1* | 5/2014 | Teng | H01Q 1/243 |
| | | | 343/702 |
| 2014/0141320 A1 | 5/2014 | Lee | |
| 2014/0178513 A1 | 6/2014 | Matthews | |
| 2014/0205775 A1 | 7/2014 | Zhang | |

FOREIGN PATENT DOCUMENTS

| | | |
|---|---|---|
| KR | 100837252 | 6/2008 |
| KR | 10-1050566 | 7/2011 |
| KR | 1020120079247 | 7/2012 |
| KR | 1020120096788 | 8/2012 |
| KR | 1020130012521 | 2/2013 |
| KR | 101443565 B1 * | 11/2014 |

OTHER PUBLICATIONS

European Search Report dated Nov. 11, 2016 issued in counterpart application No. 16178455.8-1959, 7 pages.
Korean Office Action dated Oct. 21, 2016 issued in counterpart application No. 10-2014-0114567, 8 pages.
International Search Report dated Oct. 28, 2015 issued in counterpart application No. PCT/KR2015/008368, 11 pages.
European Search Report dated Oct. 30, 2015 issued in counterpart application No. 15180695.7-1959, 7 pages.
Australian Examination Report dated Mar. 22, 2017 issued in counterpart application No. 2015302497, 3 pages.

* cited by examiner

HOUSING, MANUFACTURING METHOD THEREOF, AND ELECTRONIC DEVICE INCLUDING THE HOUSING

PRIORITY

This application claims priority under 35 U.S.C. §119(a) to Korean Patent Application Serial Nos. 10-2014-0104434 and 10-2014-0114567, which were filed in the Korean Intellectual Property Office on Aug. 12, 2014 and Aug. 29, 2014, respectively, the entire contents of which are incorporated herein by reference.

BACKGROUND

1. Field of the Invention

The present invention relates generally to an electronic device, and more particularly, to a housing, a method of manufacturing the housing, and an electronic device including the housing.

2. Description of the Related Art

With the development of electronic and telecommunication techniques, electronic devices perform various functions and may have a convergence function which performs one or more functions in combination.

Recently, a technological gap between electronic devices produced by different manufacturers has been remarkably decreased. Thus, there is a tendency to increase the rigidity of the electronic device which gradually becomes slimmer and to emphasize a design aspect in order to satisfy a consumer's need. As part of such a tendency, various constitutional elements (e.g., an exterior) of the electronic device have been implemented with a metal substance to satisfy the appeal for a good material quality and good outer appearance of the electronic device. Further, there is an effort to solve problems caused by the use of the metal substance, such as being vulnerable to rigidity, a ground problem (e.g., an electric shock, etc.), a decrease in antenna radiation performance, or the like.

In particular, when an edge portion of the electronic device is formed with the metal material, the electronic device may include a segmented portion, of which one part is segmented and filled with a non-metal member. However, the housing formed with the metal material is still vulnerable to rigidity. In particular, a metal bezel of the electronic device is frequently damaged or deformed, when the electronic device is dropped.

SUMMARY

The present invention has been made to solve at least the above-mentioned problems and/or disadvantages and to provide at least the advantages described below.

Accordingly, an aspect of the present invention is to provide a housing of which rigidity can be reinforced only with a structure of a metal bezel itself, a method of manufacturing the housing, and an electronic device including the housing.

Another aspect of the present invention is to provide a housing implemented to satisfy a consumer's need for a good outer appearance even if a housing formed with a metal material is applied, a method of manufacturing the housing, and an electronic device including the housing.

Another aspect of the present invention is to provide a housing capable of protecting an electronic device from an external impact by smoothly performing a function of the electronic device while reinforcing rigidity, a method of manufacturing the housing, and an electronic device including the housing.

According to an aspect of the present invention, a mobile phone is provided including a metal bezel having a left bezel portion and a right bezel portion and covering at least one part of an outer circumferential edge of a main body of the mobile phone, wherein upper and lower corner bezel portions of the left and right bezel portions are formed to be thicker outwardly in comparison with a middle portion of the left and right bezel portions.

According to another aspect of the present invention, a mobile phone is provided including a chamfer formed on a metal bezel covering at least one part of a rear side and a lateral side of a main body of the mobile phone, wherein the chamfer is formed between a front side or the rear side of the main body and a lateral side of the main body, and at least one non-metal segmented portion formed in one part of the metal bezel, wherein a paint is spread on a lateral wall of the metal bezel such that the lateral wall is covered and the at least one non-metal segmented portion on is exposed.

According to another aspect of the present invention, a housing is provided including a metal bezel serving as at least one area of the housing, and a non-metal member which is insert-injected to the metal bezel and serves as the remaining areas of the housing, wherein the metal bezel includes left, right, upper, and lower bezel portions, and a rear bezel portion formed to be extending from at least one part of the left, right, upper, and lower bezel portions to one part of a rear side of the housing, wherein upper left and right corner bezel portions in which the left and right bezel portions are met in the upper bezel portion and lower left and right corner bezels in which the left and right bezel portions are met in the lower bezel portion are formed to have a thickness thicker than a thickness of the left and right bezel portions.

BRIEF DESCRIPTION OF THE DRAWINGS

The above and other aspects, features and advantages of certain embodiments of the present invention will be more apparent from the following detailed description, taken in conjunction with the accompanying drawings, in which.

DETAILED DESCRIPTION OF EMBODIMENTS OF THE PRESENT INVENTION

Figure 1:
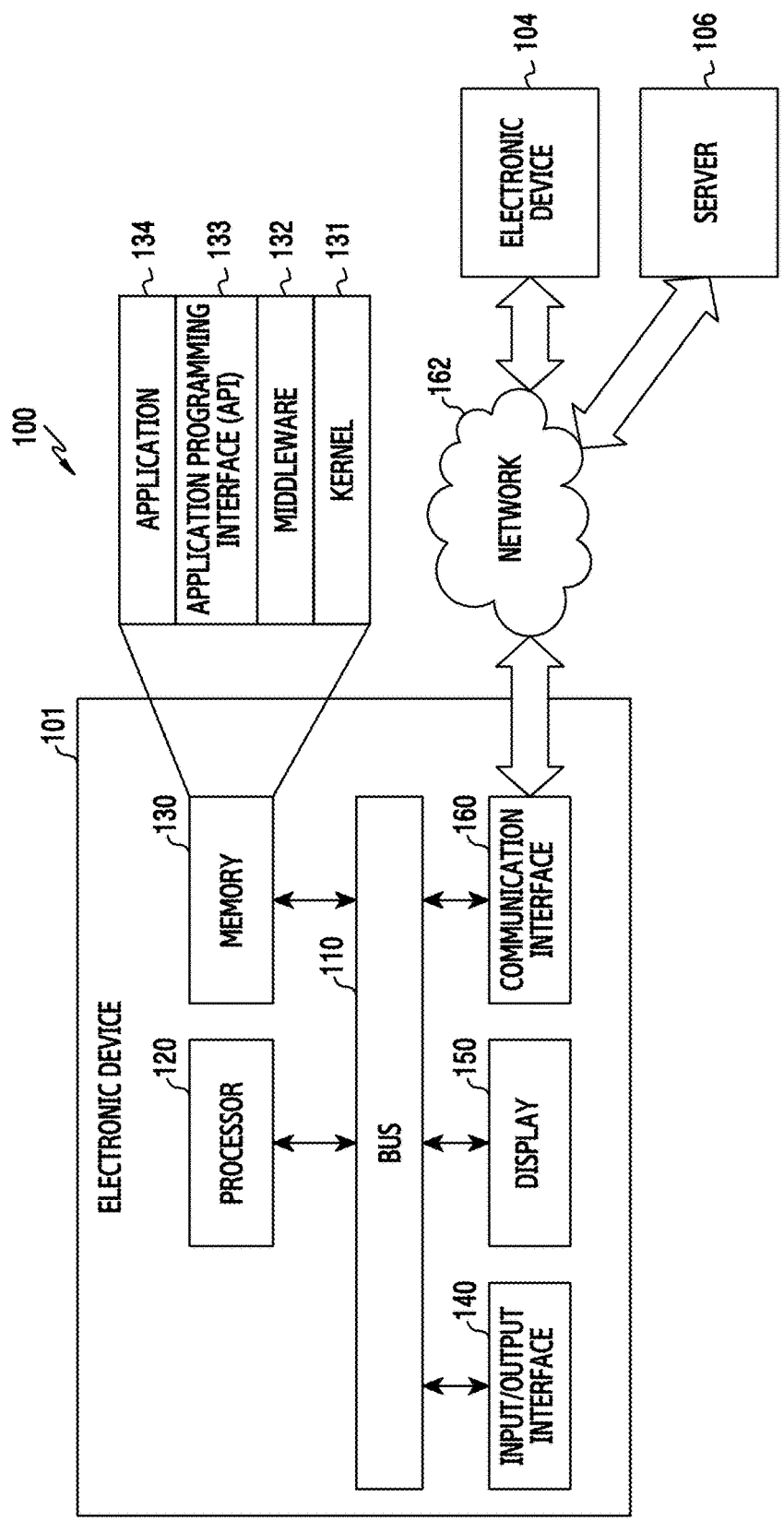
FIG. 1 illustrates a network environment including an electronic device according to an embodiment of the present invention.

FIGS. 1 through 14, discussed below, and various embodiments used to describe the principles of the present invention in this specification are by way of illustration only and should not be construed in any way to limit the scope of the present invention. Those skilled in the art will understand that the principles of the present invention may be implemented in any suitably arranged electronic devices. Hereinafter, various embodiments of the present invention are described with reference to the accompanying drawings. While the various embodiments of the present invention are susceptible to various modifications and alternative forms, embodiments thereof have been shown by way of example in the drawings and will herein be described in detail. It should be understood, however, that it is not intended to limit the present invention to the particular form or forms disclosed, but, on the contrary, the various embodiments of the present invention are intended to cover all modifications, equivalents, and alternatives falling within the spirit and scope of the present invention as defined by the appended claims. Like reference numerals denote like constitutional elements throughout the drawings.

The expressions "include" or "may include" used in the various embodiments of the present invention are intended to indicate a presence of a corresponding function, operation, or constitutional element disclosed herein, and are not intended to limit a presence of one or more functions, operations, or constitutional elements. In addition, in the various embodiments of the present invention, the terms "include" or "have" are intended to indicate that characteristics, numbers, steps, operations, constitutional elements, and elements disclosed in the specification or combinations thereof exist. As such, the terms "include" or "have" should be understood that there are additional possibilities of one or more other characteristics, numbers, steps, operations, constitutional elements, elements or combinations thereof.

In various embodiments of the present invention, an expression "or" includes any and all combinations of words enumerated together. For example, "A or B" may include A or B, or may include both of A and B.

Although expressions used in various embodiments of the present invention such as "$1^{st}$", "$2^{nd}$", "first", "second" may be used to express various constitutional elements of the various embodiments, they are not intended to limit the corresponding constitutional elements. For example, the above expressions are not intended to limit an order or an importance of the corresponding constitutional elements. The above expressions may be used to distinguish one constitutional element from another constitutional element. For example, a $1^{st}$ user device and the $2^{nd}$ user device are both user devices, and indicate different user devices. For example, a $1^{st}$ constitutional element may be referred to as a $2^{nd}$ constitutional element, and similarly, the $2^{nd}$ constitutional element may be referred to as the $1^{st}$ constitutional element without departing from the scope of the present invention.

When a constitutional element is mentioned as being "connected" to or "accessing" another constitutional element, this may mean that it is directly connected to or accessing another constitutional element, but it is to be understood that there are no intervening constitutional elements present. On the other hand, when a constitutional element is mentioned as being "directly connected" to or "directly accessing" another constitutional element, it is to be understood that there are no intervening constitutional elements present.

By the term "substantially" it is typically meant that the recited characteristic, parameter, or value need not be achieved exactly, but that deviations or variations, including but not being limited to, for example, tolerances, measurement error, measurement accuracy limitations and other factors known to persons of ordinary skill in the art, may occur in amounts that do not preclude the effect that the characteristic was intended to provide.

The term "module" used in various embodiments of the present invention may imply a unit including, for example, one of hardware, software, and firmware or a combination of two or more of them. The "module" may be interchangeably used with a term such as a unit, a logic, a logical block, a component, a circuit, and the like. The "module" may be a minimum unit of an integrally constituted component or may be a part thereof. The "module" may be a minimum unit for performing one or more functions or can be a part thereof. The "module" may be mechanically or electrically implemented. For example, the "module" of the present invention may include at least one of an Application-Specific Integrated Circuit (ASIC) chip, Field-Programmable Gate Arrays (FPGAs), and a programmable-logic device, which are known or will be developed and which perform certain operations.

The terminologies used in various embodiments of the present invention are for the purpose of describing particular embodiments only and are not intended to be limiting of the various embodiments of the present invention. A singular expression includes a plural expression unless there is a contextually distinctive difference therebetween.

Unless otherwise defined, all terms (including technical and scientific terms) used herein have the same meaning as commonly understood by those ordinarily skilled in the art to which the present invention belong. It will be further understood that terms, such as those defined in commonly used dictionaries, should be interpreted as having a meaning that is consistent with their meaning in the context of the relevant art and the various embodiments of the present invention, and are not to be interpreted in an idealized or overly formal sense unless expressly so defined herein.

An electronic device according to various embodiments of the present invention may be a device including an antenna capable of performing a communication function in at least one frequency band. For example, the electronic device may be a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a MPEG-1 Audio Layer 3 (MP3) player, a mobile medical device, a camera, and a wearable device (e.g., a Head-Mounted-Device (HMD) such as electronic glasses, electronic clothes, an electronic bracelet, an electronic necklace, an electronic appcessory, an electronic tattoo, or a smart watch).

According to various embodiments of the present invention, the electronic device may be a smart home appliance having an antenna. For example, the smart home appliance may include at least one of a TeleVision (TV), a Digital Video Disk (DVD) player, an audio, a refrigerator, an air conditioner, a cleaner, an oven, a microwave oven, a washing machine, an air purifier, a set-top box, a TV box (e.g., Samsung HomeSync™, Apple TV™, or Google TV™), a game console, an electronic dictionary, an electronic key, a camcorder, and an electronic picture frame.

According to various embodiments of the present invention, the electronic device including the antenna may be one of various medical devices (e.g., Magnetic Resonance Angiography (MRA), Magnetic Resonance Imaging (MRI), Computed Tomography (CT), imaging equipment, ultrasonic instrument, etc.), a navigation device, a Global Positioning System (GPS) receiver, an Event Data Recorder (EDR), a Flight Data Recorder (FDR), a car infotainment device, an electronic equipment for ship (e.g., a vessel navigation device, a gyro compass, etc.), avionics, a security device, a car head unit, an industrial or domestic robot, an Automatic Teller Machine (ATM) of financial institutions, and Point Of Sales (POS) of shops.

According to various embodiments of the present invention, the electronic device may be part of at least one of an item of furniture or a building/structure including an antenna. The electronic device may be an electronic board, an electronic signature input device, a projector, or any of various measurement machines (e.g., water supply, electricity, gas, propagation measurement machine, etc.). The electronic device may be one or more combinations of the aforementioned various devices. In addition, the electronic device may be a flexible device. Moreover, the electronic device is not limited to the aforementioned devices.

Hereinafter, an electronic device according to various embodiments of the present invention will be described with reference to the accompanying drawings. The term "user" used in the various embodiments may refer to a person who uses the electronic device or a device which uses the electronic device (e.g., an Artificial Intelligence (AI) electronic device).

FIG. 1 illustrates a network environment 100 including an electronic device 101 according to an embodiment of the present invention. The electronic device 101 includes a bus 110, a processor 120, a memory 130, an input/output interface 140, a display 150, and a communication interface 160

The bus 110 is a circuit for connecting the aforementioned constitutional elements to each other and for delivering communication (e.g., a control message) between the aforementioned constitutional elements.

The processor 120 receives an instruction from the aforementioned different constitutional elements (e.g., the memory 130, the input/output interface 140, the display 150, the communication interface 160, etc.), for example, via the bus 110, and thus interprets the received instruction and executes arithmetic or data processing according to the interpreted instruction.

The memory 130 stores an instruction or data received from the processor 120 or different constitutional elements (e.g., the input/output interface 140, the display 150, the communication interface 160, etc.) or generated by the processor 120 or the different constitutional elements. The memory 130 may include programming modules such as a kernel 131, a middleware 132, an Application Programming Interface (API) 133, an application 134, and the like. Each of the aforementioned programming modules may consist of software, firmware, or hardware entities or may consist of at least two or more combinations thereof.

The kernel 131 controls or manages the remaining other programming modules, for example, system resources (e.g., the bus 110, the processor 120, the memory 130, etc.) used to execute an operation or function implemented in the middleware 132, the API 133, or the application 134. In addition, the kernel 131 provides a controllable or manageable interface by accessing individual constitutional elements of the electronic device 101 in the middleware 132, the API 133, or the application 134.

The middleware 132 performs a mediation role so that the API 133 or the application 134 communicates with the kernel 131 to exchange data. In addition, regarding task requests received from the application 134, for example, the middleware 132 performs a control (e.g., scheduling or load balancing) for the task requests by using a method of assigning a priority capable of using a system resource (e.g., the bus 110, the processor 120, the memory 130, etc.) of the electronic device 101 to at least one of the applications 134.

The API 133 may include at least one interface or function (e.g., instruction) for file control, window control, video processing, character control, and the like, as an interface capable of controlling a function provided by the application 134 in the kernel 131 or the middleware 132.

The application 134 may include an Short Message Service (SMS)/Multimedia Messaging Service (MMS) application, an e-mail application, a calendar application, an alarm application, a health care application (e.g., an application for measuring a physical activity level, blood sugar level, etc.) or an environment information application (e.g., atmospheric pressure, humidity, or temperature information). Alternatively, the application 134 may be an application related to an information exchange between the electronic device 101 and an external electronic device (e.g., an electronic device 104 or server 106). The application related to the information exchange may include, for example, a notification relay application for relaying specific information to the external electronic device or a device management application for managing the external electronic device.

For example, the notification relay application may include a function of relaying notification information generated in another application (e.g., an SMS/MMS application, an e-mail application, a health care application, an environment information application, etc.) of the electronic device 101 to the external electronic device. Alternatively, the notification relay application may receive notification information, for example, from the external electronic device and provide it to the user. The device management application may manage, for example, a function for at least one part of the external electronic device which communicates with the electronic device 101.

Examples of the function include turning on/turning off the external electronic device itself (or some components thereof) or adjusting of a display illumination (or a resolution), and managing (e.g., installing, deleting, or updating) an application which operates in the external electronic device or a service (e.g., a call service or a message service) provided by the external electronic device.

The application 134 may include an application specified according to attribute information (e.g., an electronic device type) of the external electronic device. For example, if the external electronic device is an MP3 player, the application 134 may include an application related to a music play. Similarly, if the external electronic device is a mobile medical device, the application 134 may include an application related to a health care. The application 134 may include at least one of a specified application in the electronic device 101 or an application received from the external electronic device.

The input/output interface 140 relays an instruction or data input from a user by using a sensor (e.g., an acceleration sensor, a gyro sensor) or an input device (e.g., a keyboard or a touch screen) to the processor 120, the memory 130, or the communication interface 160, for example, via the bus 110. For example, the input/output interface 140 may provide data regarding a user's touch input via the touch screen to the processor 120. In addition, the input/output interface 140 outputs an instruction or data received from the processor 120, the memory 130, or the communication interface 160 to an output device (e.g., a speaker or a display), for example, via the bus 110. For example, the input/output interface 140 may output audio data provided by using the processor 120 to the user via the speaker.

The display 150 displays a variety of information (e.g., multimedia data or text data) to the user.

The communication interface 160 connects a communication between the electronic device 101 and the external electronic device 104 or the server 106. The communication interface 160 can include an antenna. For example, the communication interface 160 may communicate with the external device by being connected with a network 162 through wireless communication or wired communication. The wireless communication may include, for example, at least one of Wireless Fidelity (Wi-Fi), Bluetooth (BT), Near Field Communication (NFC), Global Positioning System (GPS), and cellular communication (e.g., Long Term Evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communication (GSM), etc.). The wired communication may include, for example, at least one of Universal Serial Bus (USB), High Definition Multimedia Interface (HDMI), Recommended Standard (RS)-232, and Plain Old Telephone Service (POTS).

The network 162 may be a telecommunications network. The telecommunications network may include at least one of a computer network, an internet, an internet of things, and a telephone network. A protocol (e.g., a transport layer protocol, a data link layer protocol, or a physical layer protocol) for communications between the electronic device 101 and an external device may be supported in at least one of the application 134, the application programming interface 133, the middleware 132, the kernel 131, and the communication interface 160.

Although a metal bezel served as a housing of an electronic device is described herein in various embodiments of the present invention, the present invention is not limited thereto. For example, the present invention is also applicable to a housing having a different construction other than that of the electronic device, and may be applied as an internal constitutional element rather than an exterior.

Although a metal bezel extending up to at least one part of a rear side along an edge is described in various embodiments of the present invention, a metal bezel which is selectively applicable to various areas of an electronic device, for example, which is applied to only one part of an edge of the electronic device or is not applied to the rear side, also complies with technical features of the present invention.

Figure 2A:
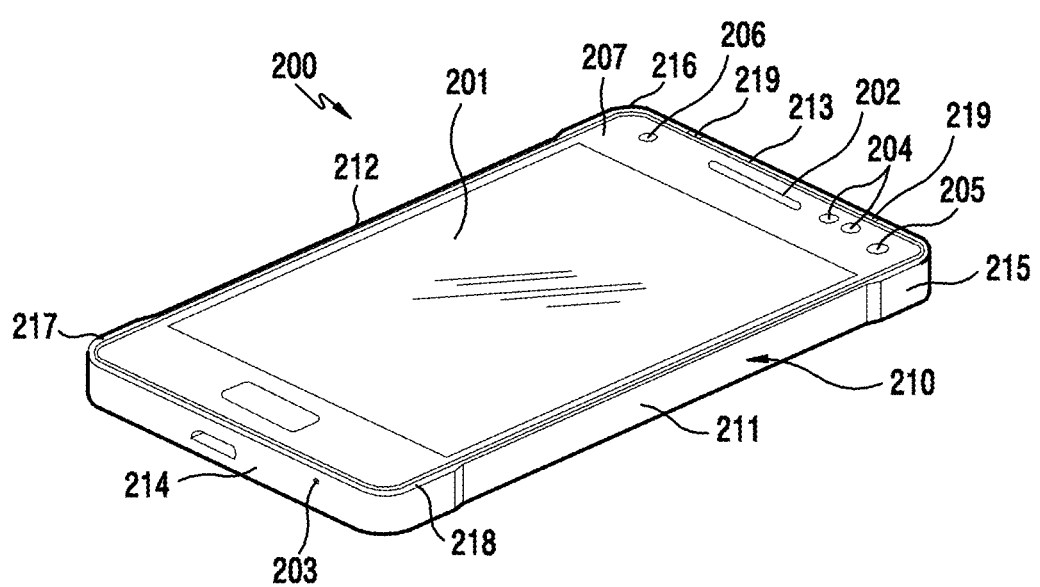
FIG. 2A is a perspective view of an electronic device to which a metal bezel is applied according to an embodiment of the present invention.
Figure 2B:
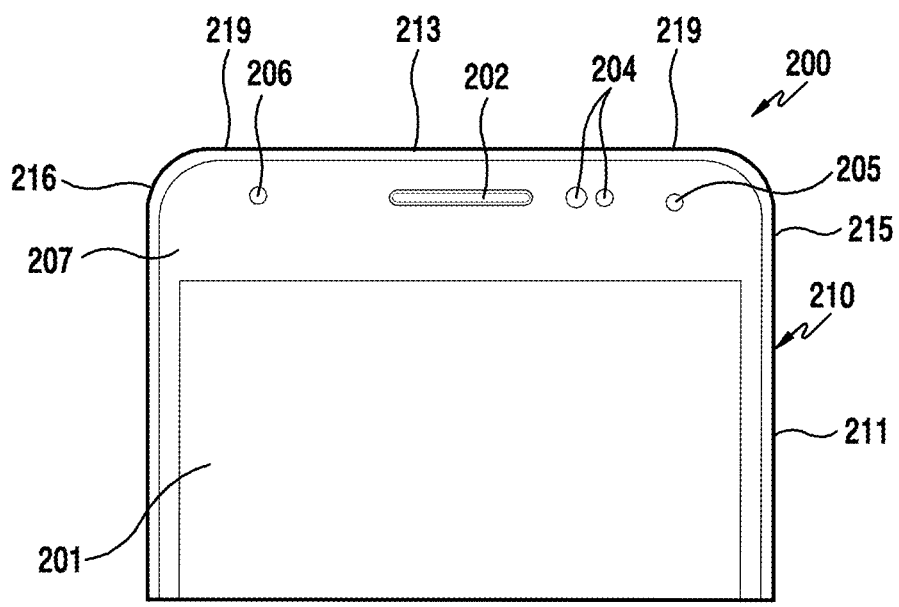
FIG. 2B is a plan view illustrating important parts of an electronic device according to an embodiment of the present invention.

FIG. 2A is a perspective view of an electronic device 200 to which a metal bezel 210 is applied according to an embodiment of the present invention. FIG. 2B is a plan view of part of the electronic device 200 illustrating important parts of the electronic device 200 according to an embodiment of the present invention.

Referring to FIG. 2A and FIG. 2B, a display 201 is installed in a front side 207 of the electronic device 200. A speaker 202 for receiving and outputting a voice of a counterpart user may be installed in an upper side of the display 201. A microphone 203 for transmitting a voice of a user of the electronic device to the counterpart user may be installed in a lower side of the display 201.

According to an embodiment of the present invention, components for performing various functions of the electronic device 200 may be placed near an area in which the speaker 202 is installed. The components may include at least one sensor module 204. The sensor module 204 may include, for example, an illumination sensor (e.g., an optical sensor), a proximity sensor (e.g., an optical sensor), an infrared sensor, and an ultrasonic sensor. According to an embodiment of the present invention, the components may include at least one of a camera 205 and a Light Emitting Diode (LED) indicator 206 to allow the user to recognize state information of the electronic device 200.

According to an embodiment of the present invention, the electronic device 200 may include the metal bezel 210 as a housing. According to an embodiment of the present invention, the metal bezel 210 may be disposed along an edge of the electronic device 200, and may extend to at least one area of a rear side of the electronic device 200 extending from the edge. According to an embodiment of the present invention, the metal bezel 210 defines a thickness of the electronic device along the edge of the electronic device 200, and may be formed in a closed-loop shape. However, the present invention is not limited thereto, and thus the metal bezel 210 may also be formed to serve as at least one part of the thickness of the electronic device 200. According to an embodiment of the present invention, the metal bezel 210 may be disposed only in at least one area of the edge of the electronic device 200. According to an embodiment of the present invention, when the metal bezel 210 serves as one part of the housing of the electronic device 200, the remaining parts of the housing may be formed of a non-metal member. In this case, the metal bezel 210 may be formed in such a manner that the non-metal member is assembled or insert-injected.

According to an embodiment of the present invention, the metal bezel 210 has a closed-loop shape along the edge, and may be disposed to serve as the entire thickness of the electronic device 200. According to an embodiment of the present invention, when the electronic device 200 is viewed from the front, the metal bezel 210 may be formed of a right bezel portion 211, a left bezel portion 212, an upper bezel portion 213, and a lower bezel portion 214. According to an embodiment of the present invention, the metal bezel 210 may include an upper-right corner bezel portion 215 in which the right bezel portion 211 and the upper bezel portion 213 meet and an upper-left corner bezel portion 216 in which the left bezel portion 212 and the upper bezel portion 213 meet. According to an embodiment of the present invention, the metal bezel 210 may include a lower-right corner bezel portion 218 in which the right bezel portion 211 and the lower bezel portion 214 meet and a lower-left corner bezel portion 217 in which the left bezel portion 212 and the lower bezel portion 214 meet. The metal bezel 210 may also include one or more segmented portions 219, which may be non-metal and formed in a specific interval between at least two parts of the metal bezel.

Figure 3A:
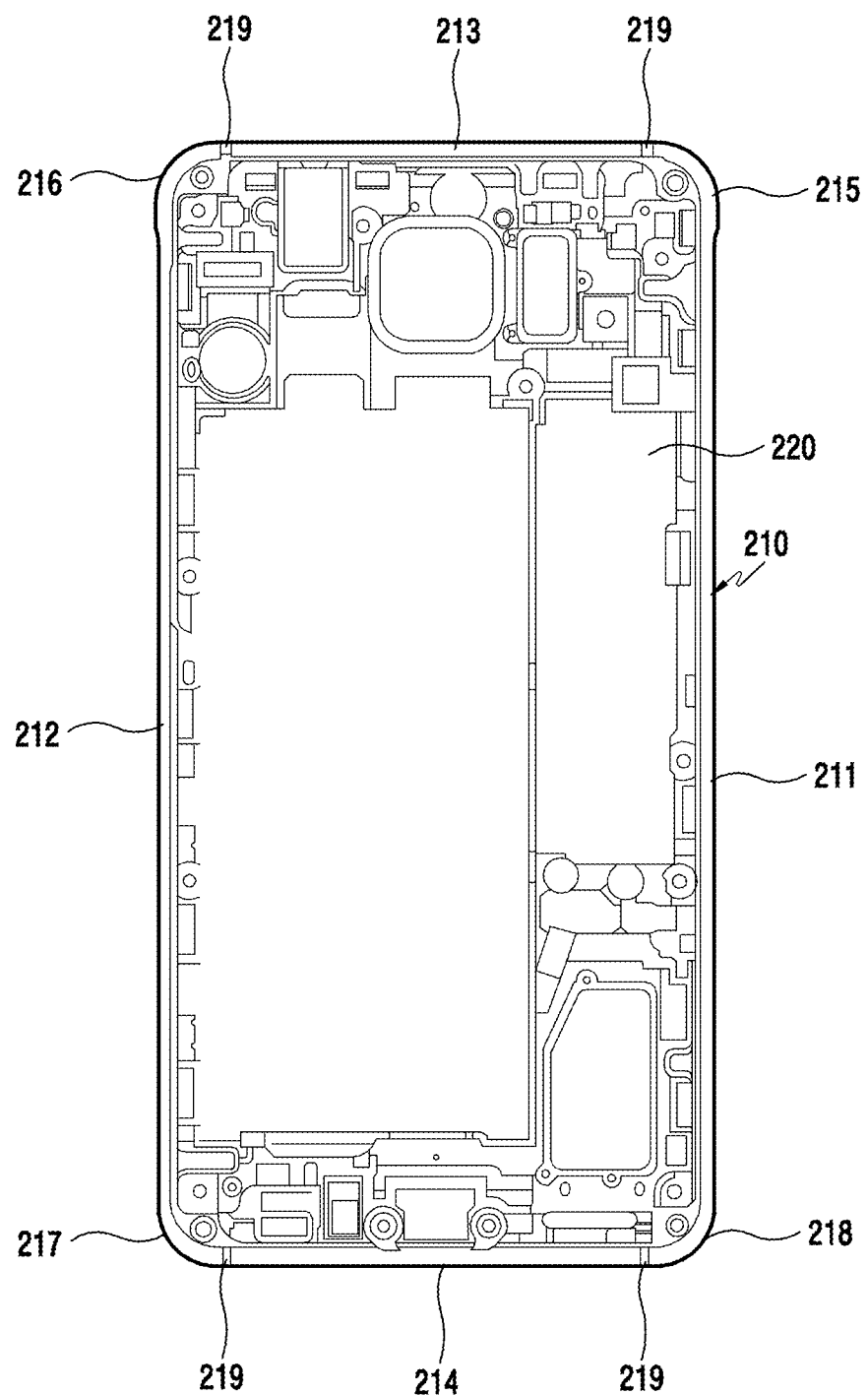
FIG. 3A illustrates a state in which a non-metal member is insert-injected to a metal bezel according to an embodiment of the present invention.

FIG. 3A illustrates a state in which a non-metal member 220 is insert-injected to a metal bezel 210 according to an embodiment of the present invention.

Referring to FIG. 3A, the non-metal member 220 may be inserted-injected to the metal bezel 210, and thus, the non-metal member 220 and the metal bezel 210 may be complete as one housing. According to an embodiment of the present invention, the metal bezel 210 may be disposed at an edge and at least one area of a rear side of the electronic device. According to an embodiment of the present invention, the metal bezel 210 may also extend up to at least one area of an inner surface of the electronic device 200. According to an embodiment of the present invention, the non-metal member 220 may be a member formed from a synthetic resin material. However, the present invention is not limited thereto, and thus various non-conductive dielectric materials may be applied.

According to an embodiment, to reinforce rigidity of the metal bezel 210, the upper-left corner bezel portion 215 and the upper-right corner bezel portion 216 may be formed to have a thickness (i.e., the thickness of the metal bezel 210) thicker than that of right bezel portion 211 and left bezel portion 212.

Figure 3B:
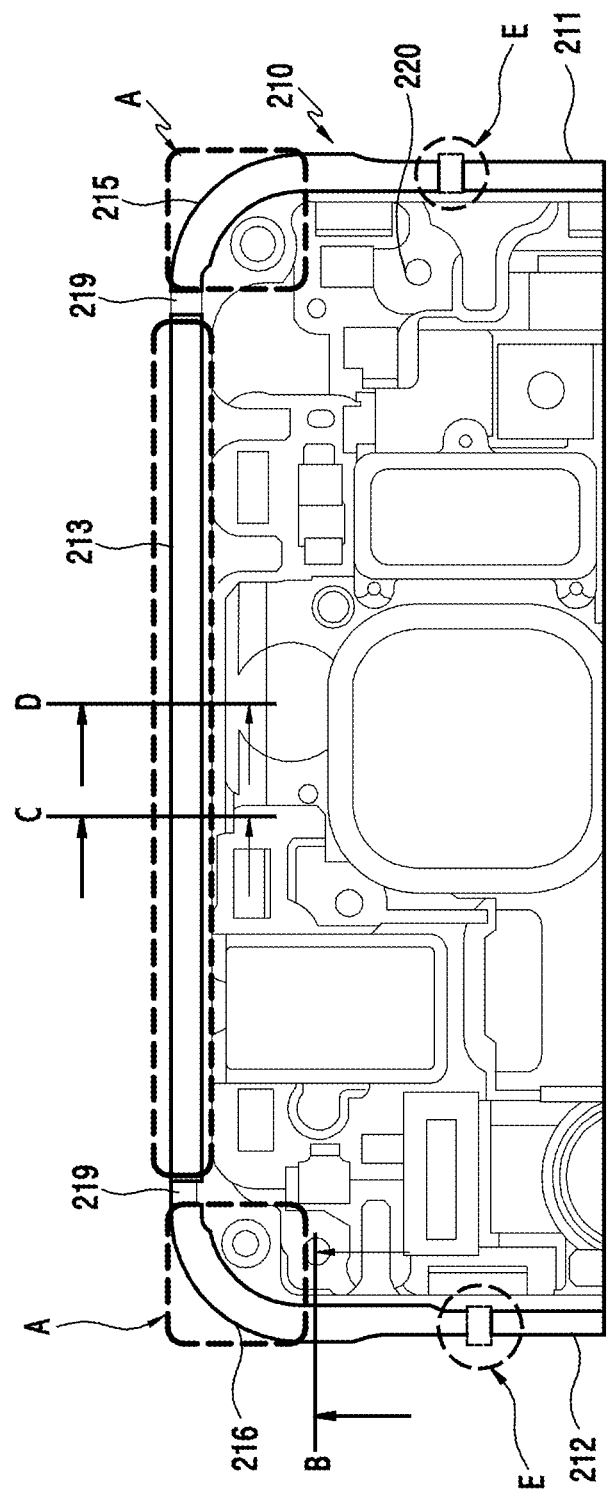
FIG. 3B illustrates parts in a state in which a non-metal member is insert-injected to a metal bezel according to an embodiment of the present invention.

FIG. 3B illustrates important parts in a state in which a non-metal member 220 is insert-injected to a metal bezel 210 according to an embodiment of the present invention.

Referring to FIG. 3B, the metal bezel 210 includes a segmented portion 219 in which at least one area of an upper bezel portion 213 is segmented. According to an embodiment of the present invention, the segmented portion 219 may be formed together when the non-metal member 220 is insert-injected to the metal bezel 210. When the electronic device 200 is used as a communication device, by the use of the segmented portion 219, the upper bezel portion 213 may be used as an antenna radiator together with an antenna radiator disposed inside of the electronic device.

Conventionally, the segmented portion is included in one area (i.e., a portion E of FIG. 3B) of each of right and left bezel portions 211 and 212 of FIG. 3B. However, in this manner, corner bezel portions 215 and 216 are also used as an antenna radiator, and cannot be formed with an increased thickness in order to ensure antenna performance.

However, according to an embodiment of the present invention, instead of using the segmented portion indicated by the portion E of FIG. 3B, at least one segmented portion 219 is disposed in a specific area of the upper bezel portion 213, and the corner bezel portions 215 and 216 are formed to have a thickness thicker than that of the right and left bezel portions 211 and 212 to reinforce rigidity, thereby being able to prevent deformation nd damage caused by external impacts.

Figure 4A:
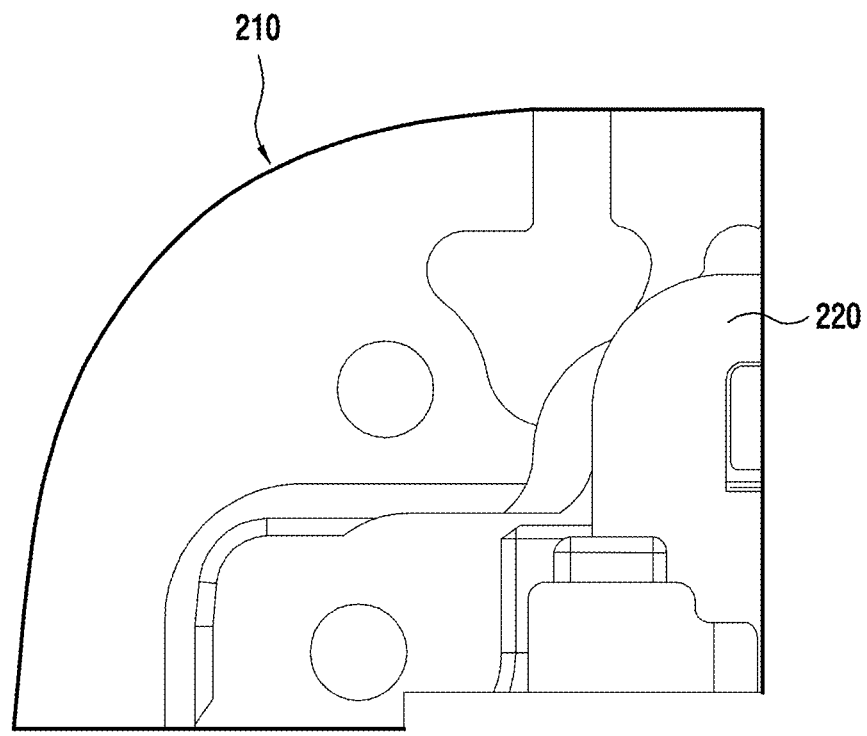
FIG. 4A is an enlarged view illustrating the parts of a portion A of FIG. 3B according to an embodiment of the present invention.
Figure 4B:
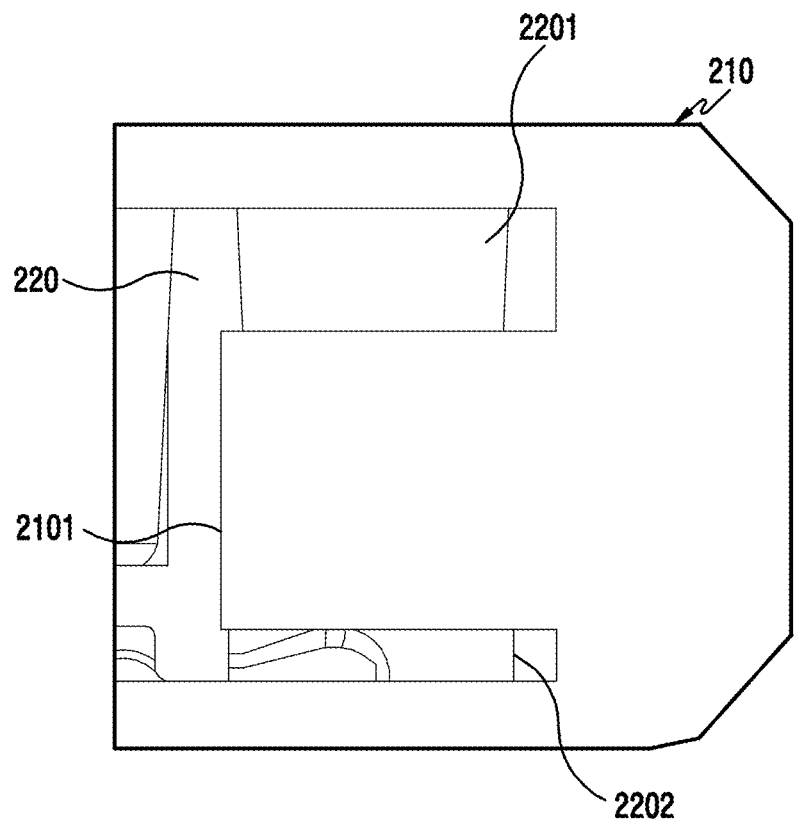
FIG. 4B is a cross-sectional view illustrating the parts of the portion A of FIG. 3B according to an embodiment of the present invention.

FIG. 4A is an enlarged view illustrating important parts of a portion A of FIG. 3B according to an embodiment of the present invention; and FIG. 4B is a cross-sectional view illustrating important parts of the portion A of FIG. 3B according to an embodiment of the present invention.

Referring to FIG. 4A and FIG. 4B, in order to secure rigidity of an electronic device, in particular, rigidity of a vulnerable corner bezel portion, a corner bezel portion of a metal bezel 210 is formed to be relatively thick, and also a non-metal member 220 is insert-injected thereto. Therefore, a joining force with respect to the non-metal member 220 can be reinforced.

According to an embodiment of the present invention, in each corner bezel portion of the metal bezel 210, a reinforcing protrusion 2101 is formed to be inserted by a specific length in an inward direction with respect to the metal bezel. Thereafter, the non-metal member 220 may be insert-injected to cover the reinforcing protrusion 2101. Therefore, a first supporting portion 2201 of the non-metal member 220 may be insert-injected to a first part of the reinforcing protrusion 2101, and a second supporting portion 2202 of the non-metal member 220 may be insert-injected to a second part of the reinforcing protrusion 2101. In this case, a contact area between the metal bezel 210 and the non-metal member 220 is extended, and thus rigidity of each corner bezel portion of the metal bezel 210 can be secured.

Figure 5A:
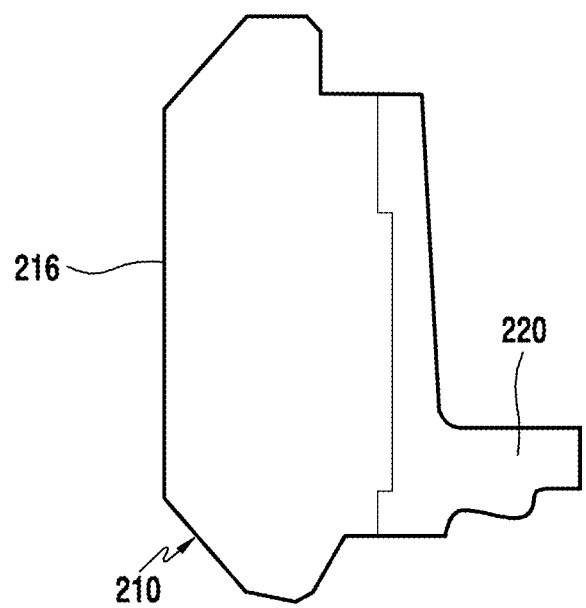
FIG. 5A to FIG. 5C are cross-sectional views illustrating important parts viewed respectively from the reference lines B, C, and D of FIG. 3B according to an embodiment of the present invention.
Figure 5B:
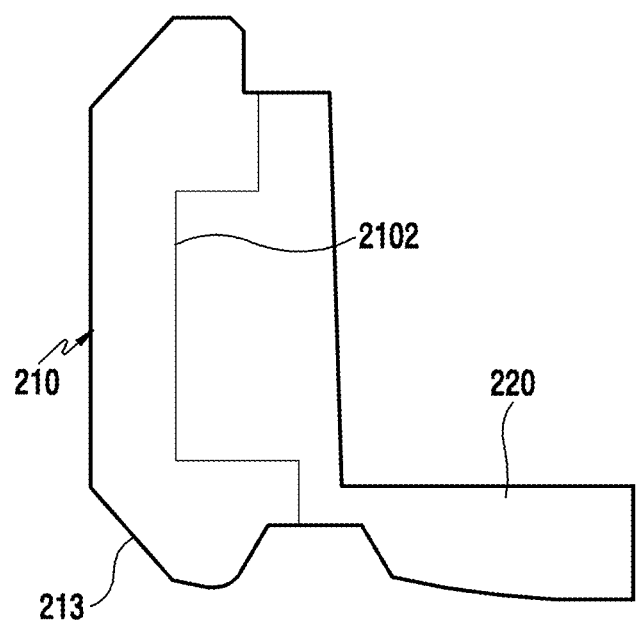
Figure 5C:
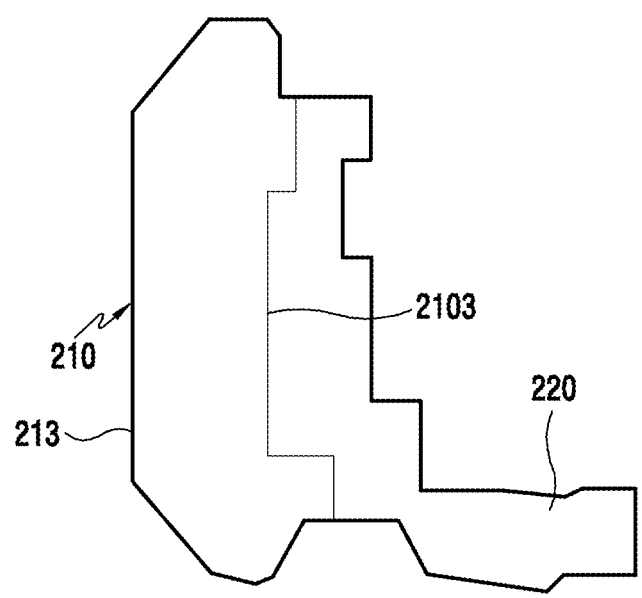

FIG. 5A to FIG. 5C are cross-sectional views illustrating important parts viewed respectively from the reference lines B, C, and D of FIG. 3B according to an embodiment of the present invention.

According to an embodiment of the present invention, a thickness is constant from each corner bezel portion to upper and lower bezel portions in terms of an outer appearance. However, if the upper and lower bezel portions are used as an antenna radiator, antenna radiation performance may deteriorate due to an increase in the thickness.

As shown in FIG. 5A, the cornel bezel portion 216 may be formed such that a cross-section thereof is also thick, whereas as shown in FIG. 5B and FIG. 5C, the upper bezel portion 213 may be formed to have slits 2102 and 2103 inwardly in a lengthwise direction of the upper bezel portion 213. The slits 2102 and 2103 prevent performance deterioration of an antenna radiator which is covered by the metal bezel 210, and if the upper bezel portion 213 is used as an antenna radiator, improved antenna radiation performance can be achieved. According to an embodiment of the present invention, the non-metal member 220 fills the aforementioned slits 2102 and 2103 of the upper bezel portion 213 after insert-injection, and since the non-metal member 220 is a dielectric material, it does not have an effect on antenna radiation performance even if a thickness thereof is increased.

Figure 6A:
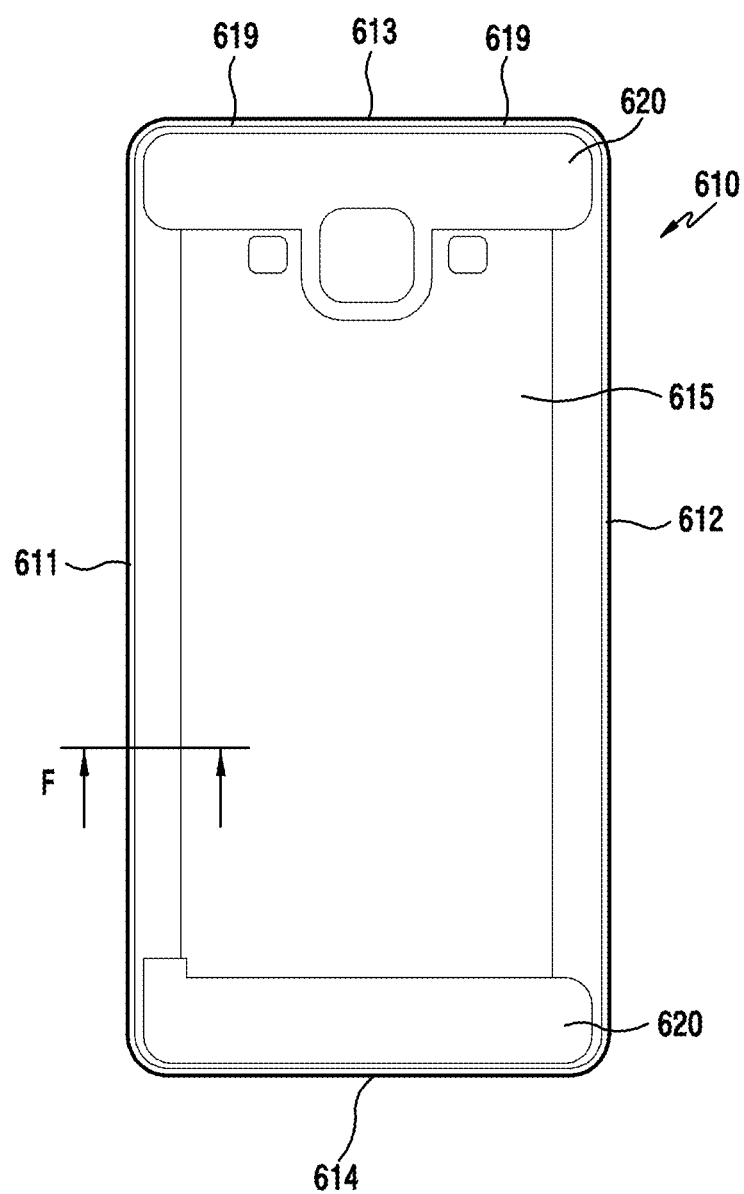
FIG. 6A illustrates a state in which a non-metal member is insert-injected to a metal bezel according to another embodiment of the present invention.

FIG. 6A illustrates a state in which a non-metal member 620 is insert-injected to a metal bezel 610 according to another embodiment of the present invention.

Referring to FIG. 6A, the metal bezel 610 may include an edge serving as a lateral side of an electronic device which defines the thickness of the electronic device and one area of a rear side of the electronic device, and the non-metal member 620 may be insert-injected in the remaining areas. However, the present invention is not limited thereto, and only one area of the edge of the electronic device may be formed as the metal bezel 610. According to an embodiment of the electronic device, the edge may include left, right, upper, and lower bezel portions 611, 612, 613, and 614. After the non-metal member 620 is insert-injected, painting may be performed on the entirety of the metal bezel 610 by including a boundary surface thereof. A boundary portion between the metal bezel 610 and the non-metal member 620 is not recognizable by a naked eye due to the painting process, thereby providing a good outer appearance.

Figure 6B:
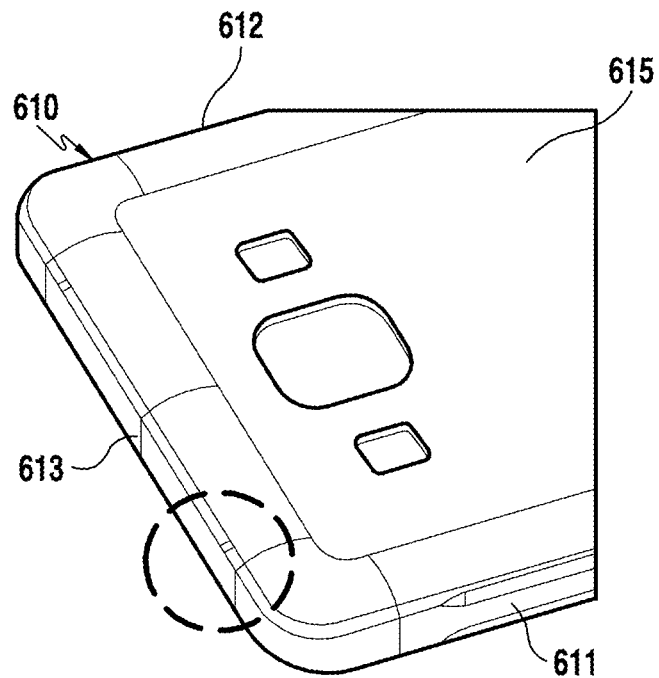
FIG. 6B is a perspective view illustrating parts of a state in which an outer surface is painted after a non-metal member is insert-injected to a metal bezel according to another embodiment of the present invention.
Figure 6B:
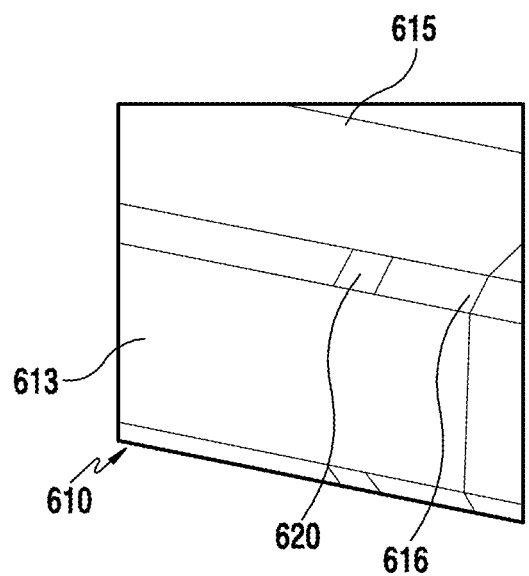

FIG. 6B is a perspective view illustrating important parts of a state in which an outer surface is painted after a non-metal member 620 is inserted-injected to a metal bezel 610 according to another embodiment of the present invention.

Referring to FIG. 6B, a part of the rear portion 615, on which painting has been performed after the non-metal member 620 is insert-injected to the metal bezel 610, (in the dotted circle) is shown in an enlarged view. A chamfer 616 may be finally formed along a lengthwise direction in a boundary portion between the rear portion 615 of the metal bezel 610 and each of lateral bezel portions 611, 612, 613, and 614. The chamfer 616 may be formed by a diamond cutting process.

According to the present invention, after the painting, as a final process, the chamfer 616 may be formed in a lengthwise direction in a boundary portion between the upper bezel portion 613 and the rear bezel portion 615 of the metal bezel 610. The non-metal member 620 may be exposed in the chamfer 616 because of a chamfering process after the painting process. That is, a segmented portion formed in a boundary portion in the metal bezel 610 by insert-molding of the non-metal member 620 is not exposed to the outside except for the chamfer 616 having a relatively small area (i.e., the non-metal member 620) due to the painting, and thus the electronic device may have a good outer appearance.

Figure 6C:
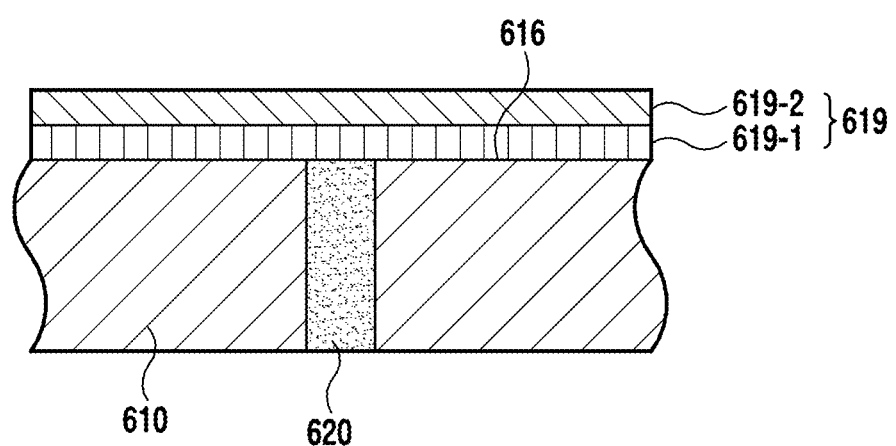
FIG. 6C is a cross-sectional view illustrating important parts of a state in which a surface treatment layer for preventing corrosion is formed in a chamfer area according to another embodiment of the present invention.

FIG. 6C is a cross-sectional view illustrating important parts of a state in which a surface treatment layer for preventing corrosion is formed in a chamfer area according to another embodiment of the present invention.

Referring to FIG. 6C, a metal portion may be exposed to the outside due to a chamfer 616 formed in a corner of a metal bezel 610, and the exposed metal portion may be vulnerable to corrosion. Therefore, a surface treatment layer 619 for preventing the corrosion may be further formed on the surface of a painting area including the chamfer 616. According to another embodiment of the present invention, the surface treatment layer 619 may be formed only in the area of chamfer 616.

According to another embodiment of the present invention, the surface treatment layer 619 may include a primer layer 619-1 laminated with a specific thickness on the surface of the painting area and an Anti Fingerprint (AF) coating layer 619-2 laminated on the surface of the primer layer 619-1.

According to the present invention, the primer layer 619-1 is provided to smoothly laminate the AF coating layer 619-2, and may be formed by performing a vacuum deposition or sputtering process on a $SiO_2$ type or $Al_2O_3$ type material. According to another embodiment of the present invention, the primer layer 619-1 may be formed not only with a single material but also by depositing a material in which $SiO_2$ and $Al_2O_3$ are mixed in a specific ratio.

According to the present invention, the primer layer 619-1 may be formed as a multi-layered layer in such a manner that the $Al_2O_3$ material is formed with a specific thickness and the $SiO_2$ material is additionally formed with a specific thickness. The primer layer 619-1 may be formed with a thickness of 20 to 2000 nanometers.

The AF coating layer 619-2 may be formed by depositing a material having excellent anti-friction, anti-fouling, and chemical resistance properties. According to another embodiment of the present invention, a ceramic coating layer may be applied instead of an AF coating layer.

Figure 7A:
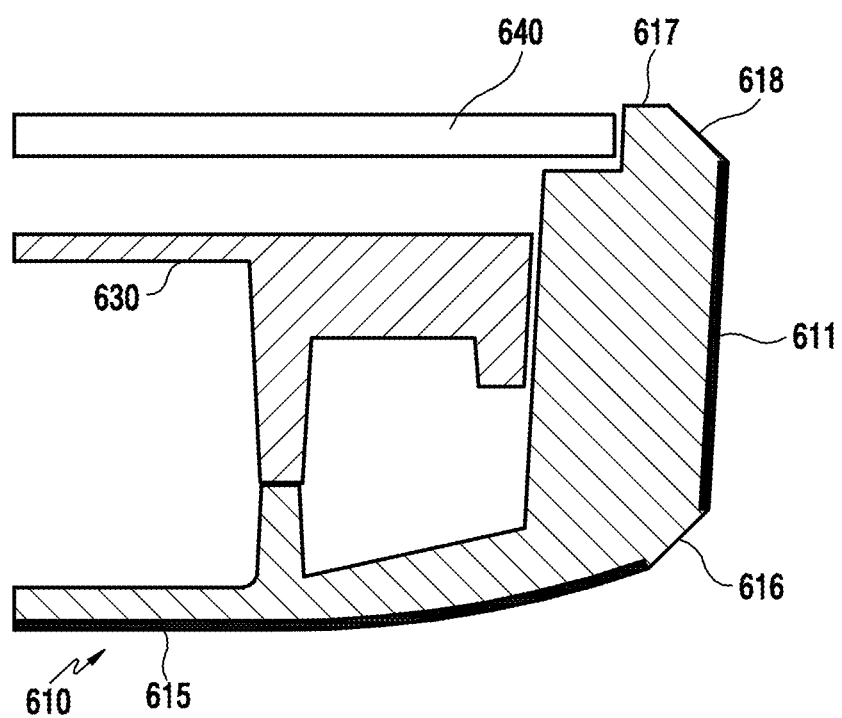
FIG. 7A and FIG. 7B are cross-sectional views viewed from the reference line F of FIG. 6A according to an embodiment of the present invention.
Figure 7B:
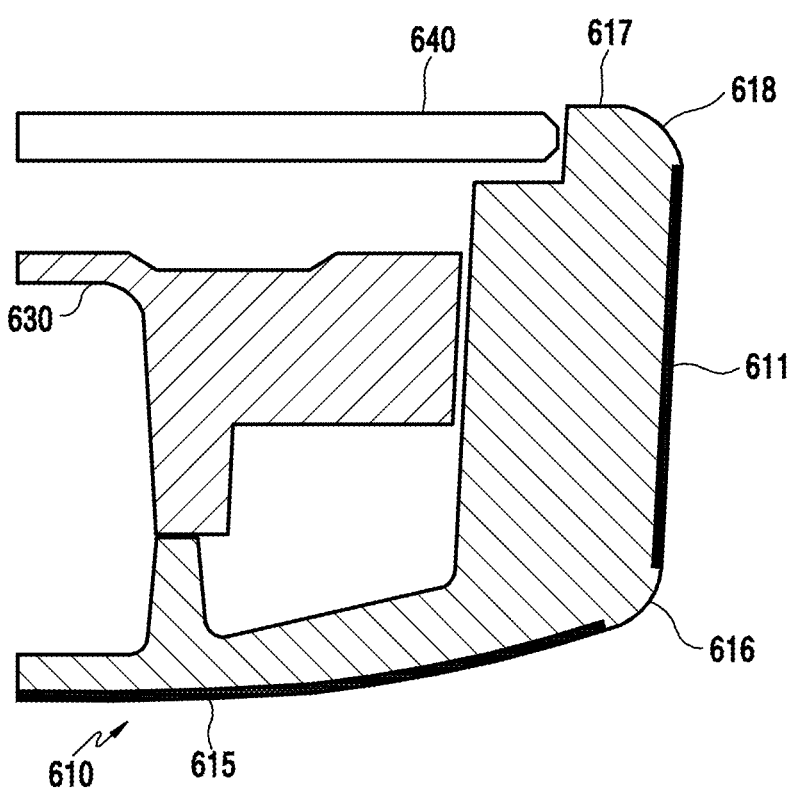

FIG. 7A and FIG. 7B are cross-sectional views viewed from the reference line F of FIG. 6A according to an embodiment of the present invention.

Referring to FIG. 7A, a metal bezel 610 may be formed as a housing. The metal bezel 610 may support an internal bracket 630. A window 640 may be installed in an upper side of the internal bracket 630. Although not shown, a display may be disposed between the window 640 and the bracket 630.

According to the present invention, the metal bezel 610 may have a chamfer forming area 616 formed in a boundary portion between a rear portion 615 and a right bezel portion 611. According to another embodiment of the present invention, the chamfer forming area 616 may be flat. Also, between the right bezel portion 611 and the window 640, a chamfer forming area 618 may also be formed in a boundary portion with respect to an upper front area 617 of the electronic device. Although not shown, the chamfer forming area 618 may be formed in each of a lower end portion and upper end portion of the right bezel portion 611, that is, in a boundary portion between a front side and rear side of the electronic device.

Referring to FIG. 7B, the chamfer forming areas 616 and 618 may be formed in an outwardly curved shape. Although not shown, according to another embodiment of the present invention, the chamfer forming areas 616 and 618 may be formed in an inwardly curved shape. According to another embodiment of the present invention, at least two chamfers may be formed consecutively to be neighboring to each other in a boundary portion between the right bezel portion 611 and the rear bezel portion 615 of the electronic device or in a boundary portion between the right bezel portion 611 and the upper front area 617.

Figure 8:
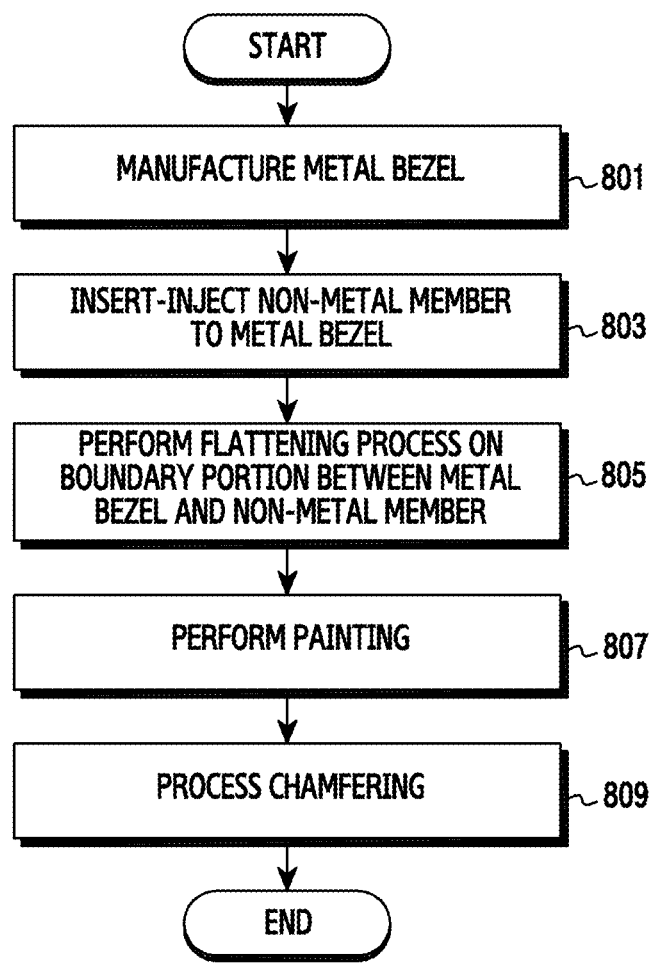
FIG. 8 is a flowchart for manufacturing a metal bezel (e.g., a housing) of an electronic device according to another embodiment of the present invention.
Figure 9A:
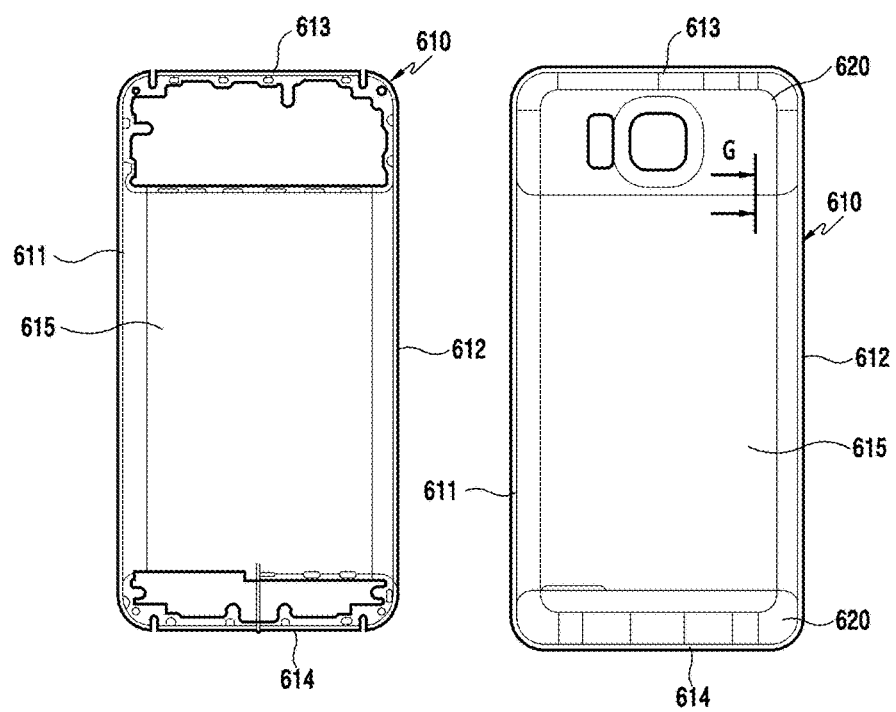
FIG. 9A to FIG. 9C illustrate an operation based on a manufacturing process of a metal bezel of FIG. 8 according to another embodiment of the present invention.
Figure 9B:
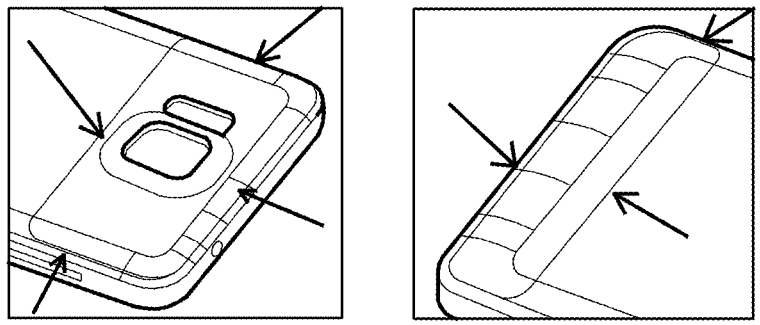
Figure 9B:
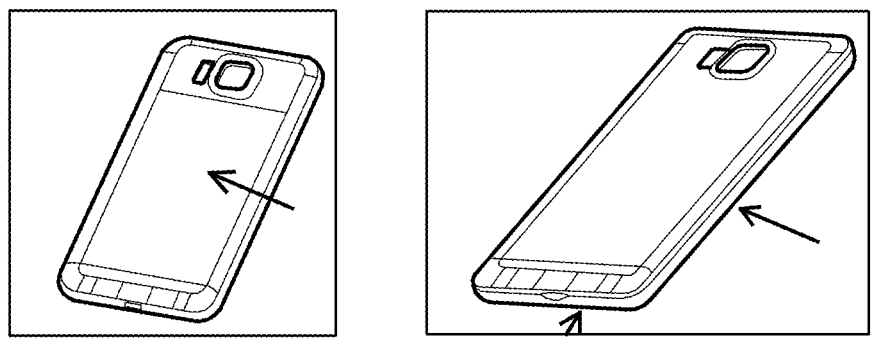
Figure 9C:
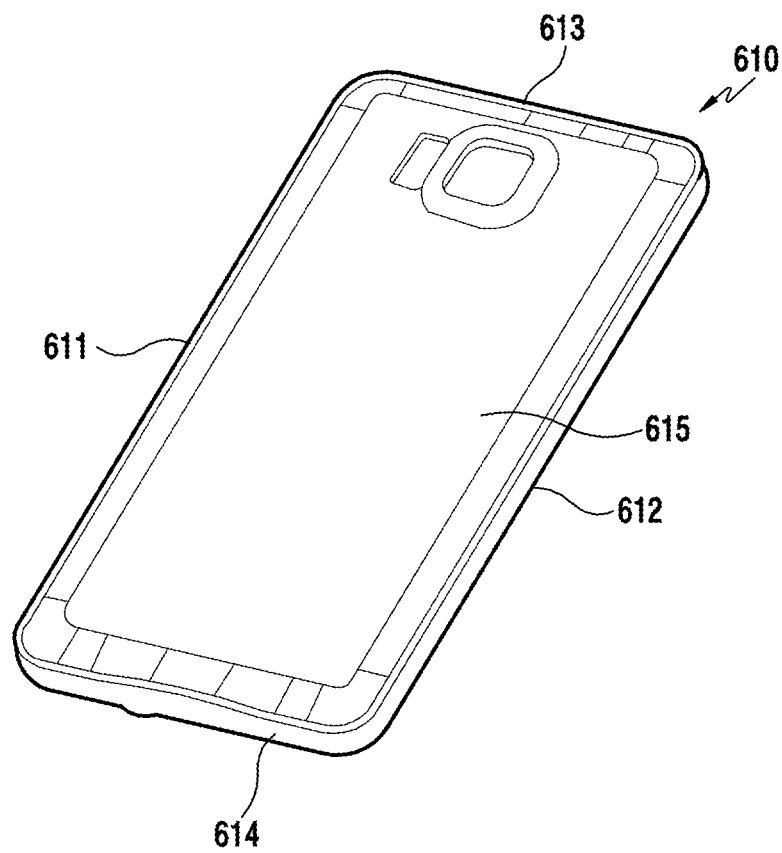

FIG. 8 is a flowchart for manufacturing a metal bezel (e.g., a housing) of an electronic device according to an embodiment of the present invention. FIG. 9A to FIG. 9C illustrate an operation based on the manufacturing process of the metal bezel of FIG. 8 according to the present invention.

The process of FIG. 8 will be described with reference to the drawings of FIG. 9A to FIG. 9C. FIG. 9A illustrates a front view and a rear view of the metal bezel 610 having a non-metal member insert-injected. FIG. 9B illustrates a flattening process. FIG. 9C illustrates a view of the electronic device after a printing process.

Referring to FIG. 8, in step 801, a metal bezel 610 without a non-metal member is manufactured. As shown in FIG. 9A, the metal bezel 610 may be formed with various metal materials such as aluminum, magnesium, Steel Use Stainless (SUS), etc., and casting, pressing, or the like may be used to complete a desired molding product. As shown in FIG. 9A, the metal area of the metal bezel 610 may include a right bezel portion 611, left bezel portion 612, upper bezel portion 613, and lower bezel portion 614 serving as an edge of the electronic device and defining its thickness, and may include a rear bezel portion 615 connected to at least one area of each of the bezel portions 611, 612, 613, and 614. The rear bezel portion 615 may be disposed in at least one area of a rear side of the electronic device.

In step 803, a non-metal material is insert-injected to the formed metal bezel to fill a portion in which a metal area is not provided, and as shown in FIG. 9A.

In step 805, a flattening process is performed on a boundary portion of the metal bezel 610 and the non-metal bezel 620. Referring to FIG. 9B, in the flattening process, buffing may be performed not only on a boundary portion of the metal bezel 610 and the non-metal bezel 620, but also on all of a rear bezel portion 615 and each of bezel portions 611, 612, 613, and 614. According to another embodiment of the present invention, the buffing may be performed more than twice.

In step 807, painting is performed on the entire outer surface of the metal bezel 610, of which flattening is complete. According to such a painting process, as shown in FIG. 9C, a boundary area may be hidden by applying heterogeneous materials with respect to the metal bezel 610. According to the present invention, by the use of the painting process, the housing of the electronic device may appear to be formed with a single material and thus provides a good outer appearance. According to the present invention, the painting process may include a soft-feel process to provide a user with an excellent tactility and texture depending on a type of paint to be applied (e.g., a natural substance paint).

In step 809, a chamfer 616 may be formed in a lengthwise direction in a boundary portion between each of the bezel portions 611, 612, 613, and 614 and the rear bezel portion 615. According to the present invention, the chamfer 616 may provide a good outer appearance of the electronic device by partially exposing the metal material of the metal bezel 610, and may provide an excellent grip feel to a user in comparison with an angular corner.

FIG. 10A to FIG. 10E illustrate a flattening process and a painting process after a non-metal member 620 is insert-injected to a metal bezel 610 with respect to the reference line G of FIG. 9A according to an embodiment of the present invention.

Figure 10A:
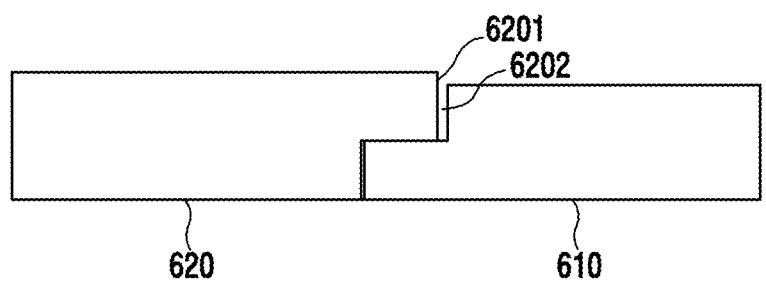
FIG. 10A to FIG. 10E illustrate a flattening process and a painting process after a non-metal member is insert-injected to a metal bezel with respect to a portion G of FIG. 9 according to another embodiment of the present invention.

As shown in FIG. 10A, if the non-metal member 620 is insert-injected to the metal bezel 610, a step difference portion 6201 or a gap 6202 may be produced in a boundary portion between heterogeneous materials. An outer surface may partially protrude due to the step difference portion 6201 even if the painting process is performed, and one portion of the outer surface is dented due to the gap 6202.

Figure 10B:
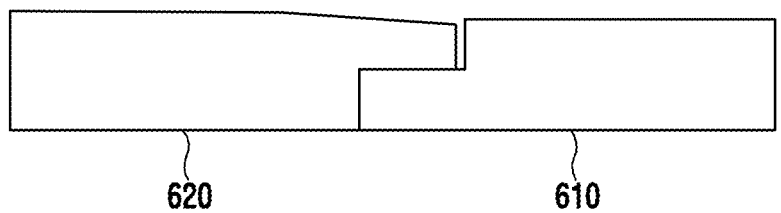
Figure 10C:
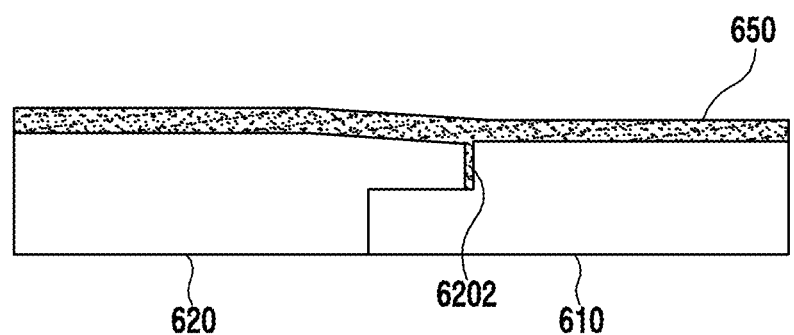

The step difference portion 6201 may be removed through buffing as shown in FIG. 10B, and a primer 650 with a specific thickness may be laminated as shown in FIG. 10C. According to an embodiment of the present invention, the primer 650 may use putty, and may fill the gap 6202 of the boundary portion between the aforementioned heterogeneous materials.

Figure 10D:
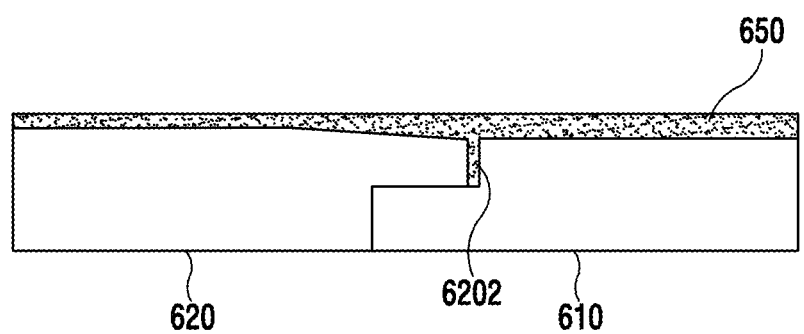
Figure 10E:
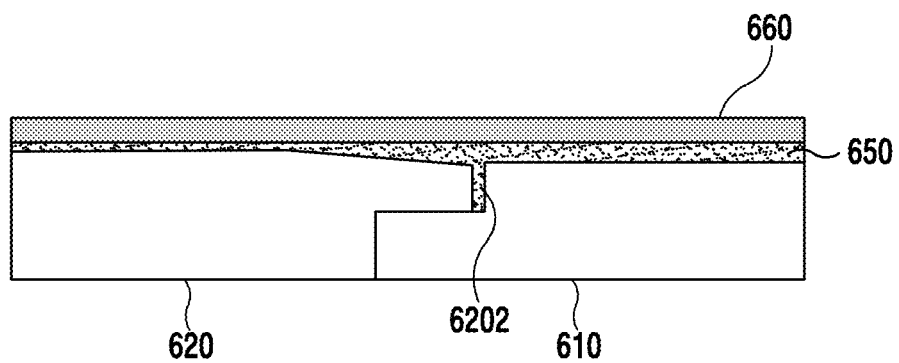

Thereafter, as shown in FIG. 10D, after the primer 650 is hardened, buffing is performed again so that an area of a metal bezel and an area of a non-metal member form a flat-plane. Thereafter, as shown in FIG. 10E, a painting layer 660 may be formed by spreading a paint on the surface of the primer 650 after buffing. Thereafter, chamfering may be performed.

Figure 11A:
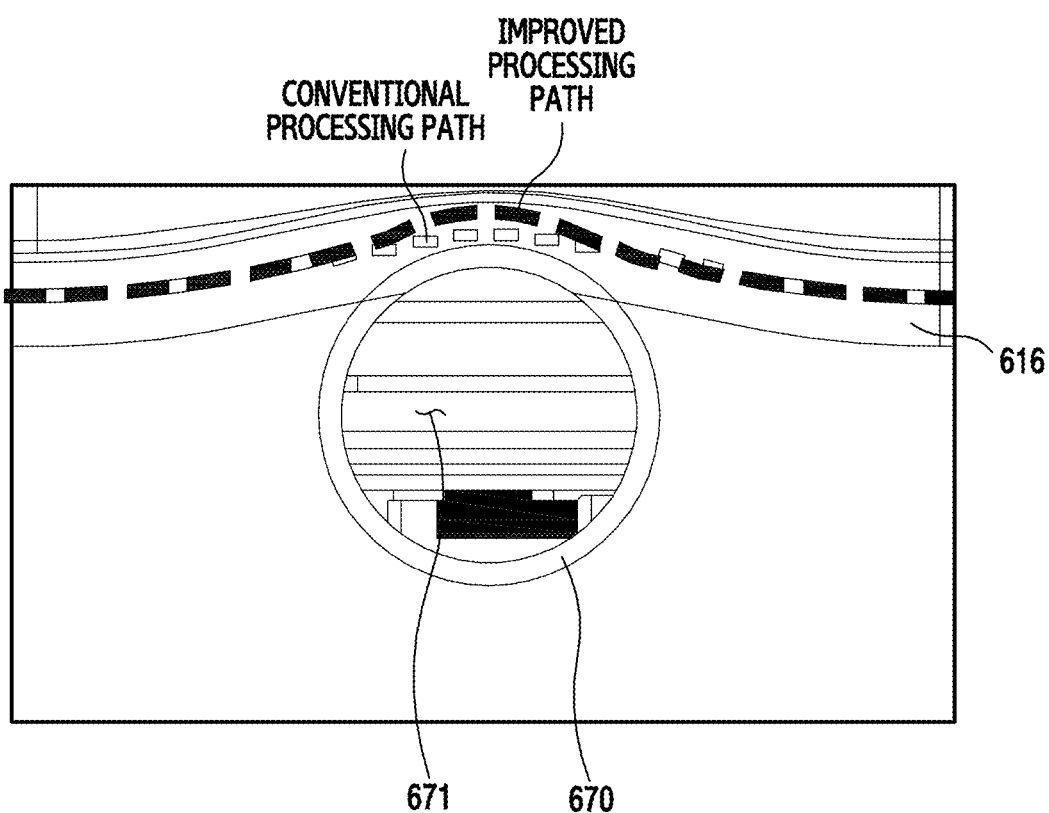
FIG. 11A and FIG. 11B illustrate a chamfer located near an ear-jack hole of an electronic device and a processing path according to another embodiment of the present invention.
Figure 11B:
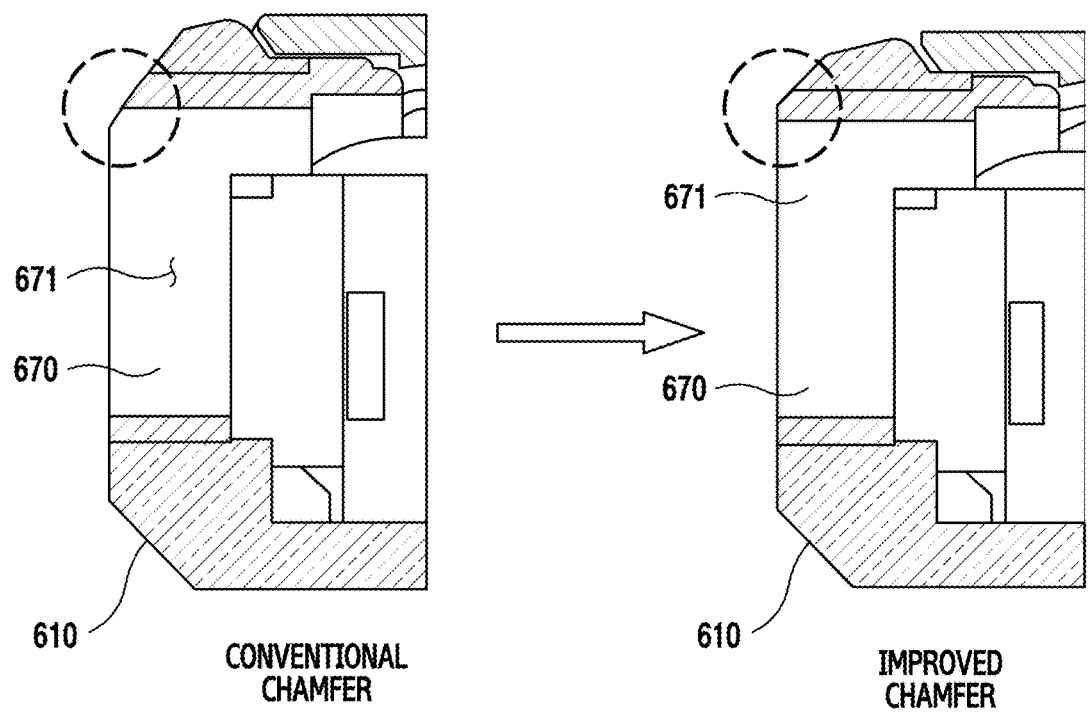

FIG. 11A and FIG. 11B illustrate a chamfer 616 located near an ear-jack hole 671 of an electronic device and a processing path of chamfering according to another embodiment of the present invention.

Referring to FIG. 11A, the electronic device includes an ear-jack assembly for accommodating an ear plug of a headset. In this case, the ear-jack hole 671 for accommodating the ear plug may be generally disposed on a lateral bezel portion of the electronic device. In addition, the ear-jack hole 671 may accommodate the ear-jack assembly, and a mold portion 670 may be formed together so that the ear-jack hole 671 can be electrically isolated from a metal bezel formed with a metal material. According to the present invention, the ear-jack hole 671 and the mold portion 670 may be included in a processing path of the aforementioned chamfer 616. Since the mold portion 670 is processed together by the forming of the chamfer 616, a thickness of an ear-jack hole portion becomes thicker under the conventional chamfer shown in FIG. 11B, which may result in being partially vulnerable to rigidity.

According to the present invention, when moving a processing tool (e.g., a diamond cutting tool) for processing the chamfer 616, as shown in FIG. 11A, a thickness of the chamfer 616 towards an ear-jack hole portion may be reinforced by the use of an improved chamfer of FIG. 11B by changing the processing direction between a horizontal direction and a vertical direction using the processing tool. According to the present invention, when processing the chamfer of the ear-jack hole portion, a processing path of the processing tool may be moved in a direction away from the ear-jack hole.

According to an embodiment of the present invention, such a chamfering method may be used not only for a case of using the ear-jack hole but also for a case where the processing tool passes various electronic component accommodating spaces (e.g., an interface connector port, a microphone hole, a speaker hole, etc.) which require an opening exposable to an outer surface of the electronic device.

Figure 12A:
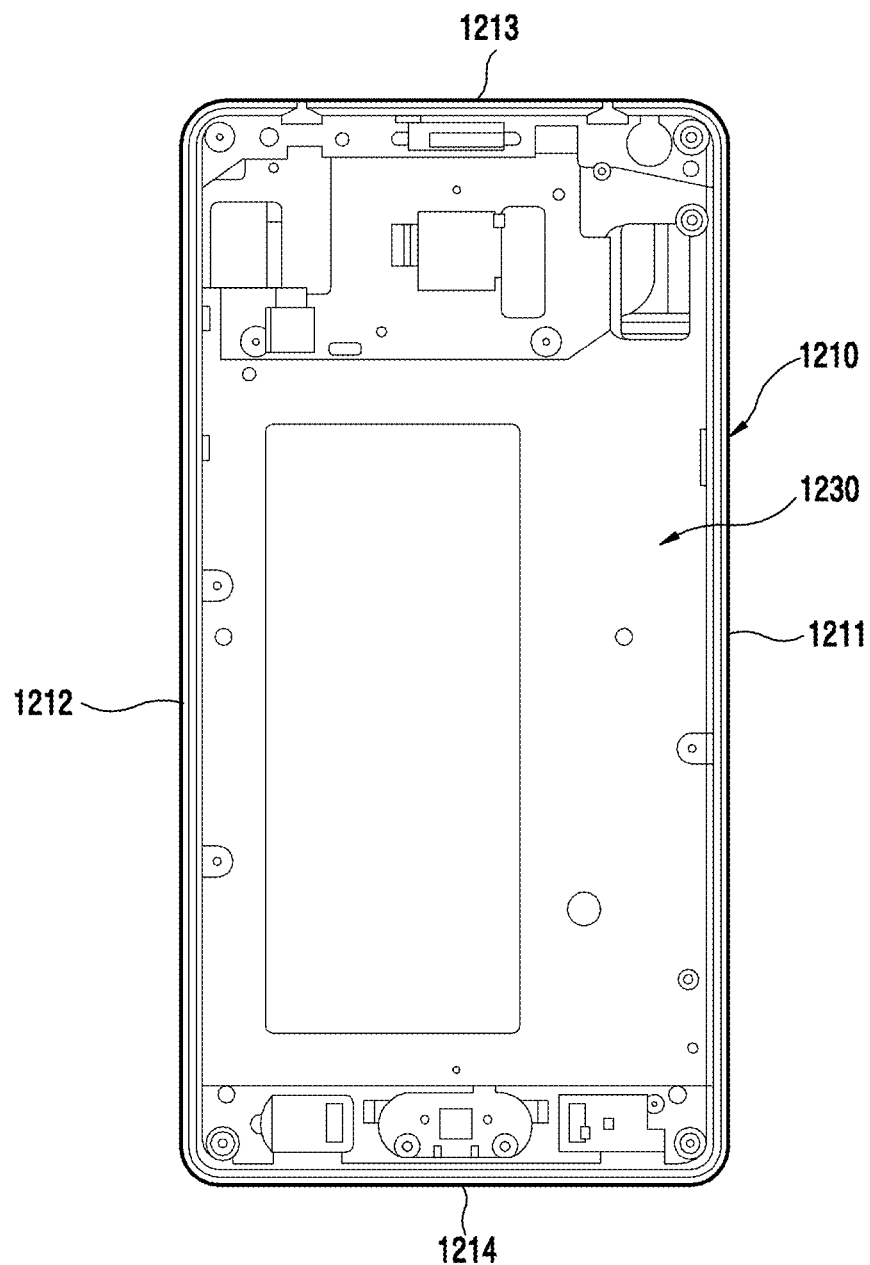
FIG. 12A illustrates a structure in which a secondary housing formed with a non-metal material is assembled in a metal bezel according to another embodiment of the present invention.

FIG. 12A illustrates a structure in which a secondary housing 1230 formed with a non-metal material is assembled in a metal bezel 1210 according to another embodiment of the present invention.

Referring to FIG. 12A, a secondary housing 1230 formed with a non-metal member may be insert-injected to the metal bezel 1210, and thus the metal bezel 1210 with the secondary housing 1230 may be complete as a housing of the electronic device. According to the present invention, the metal bezel 1210 may be disposed in an edge and at least one area of a rear side of the electronic device. The metal bezel 1210 may also extend to at least one area of an inner surface of the electronic device. An edge of the metal bezel 1210 may include right, left, upper, and lower bezel portions 1211, 1212, 1213, and 1214.

According to the present invention, the secondary housing 1230 may be formed with a non-metal material, or the secondary housing 1230 may be formed in such a manner that a metal material is assembled in the non-metal material. Also, the secondary housing 1230 may be formed in such a manner that the non-metal material is insert-injected to the metal material.

According to the present invention, the secondary housing 1230 may be formed in such a manner that it is not physically in contact with the metal bezel 1210 even if the metal material is included. This is for preventing an electric shock accident which may occur when current is applied to the metal bezel 1210 when electronic components (e.g., a Printed Circuit Board (PCB)) included in the secondary housing 1230 are used.

Figure 12B:
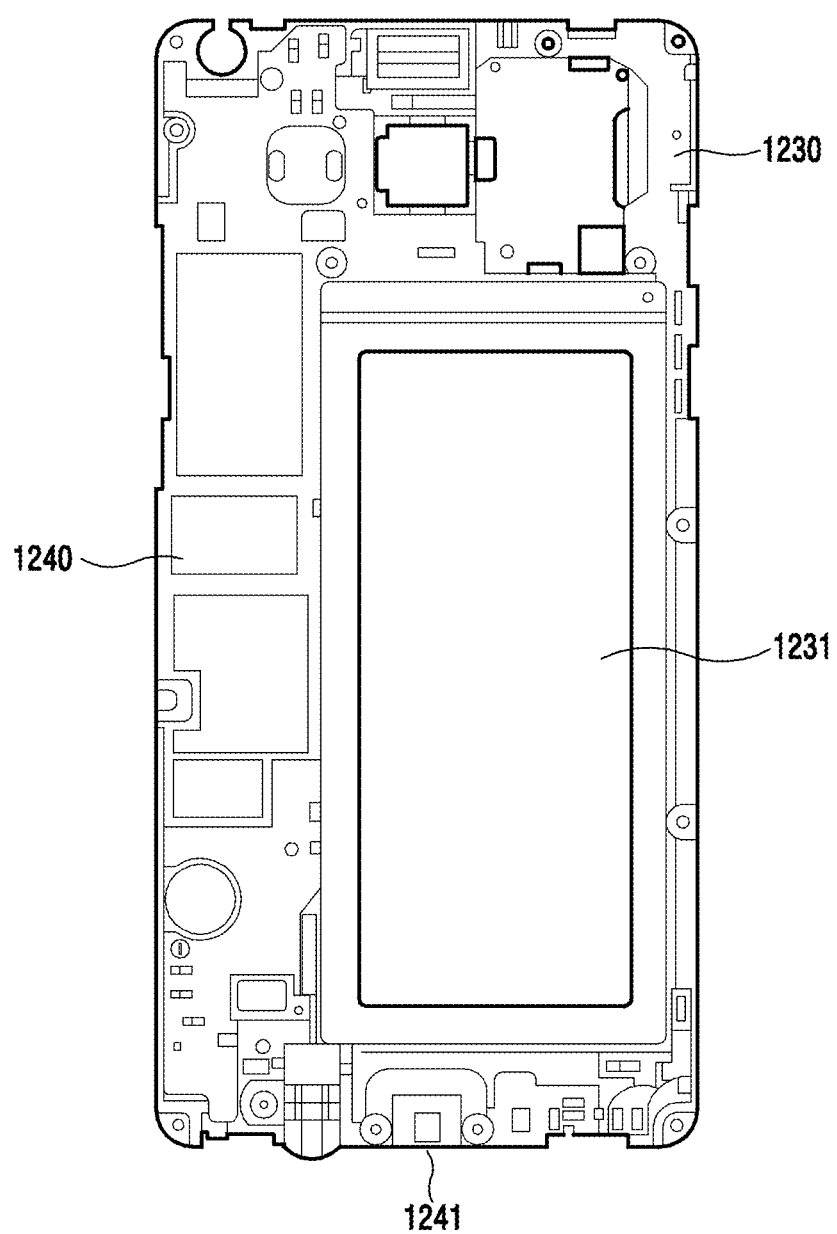
FIG. 12B illustrates a structure of a secondary housing (e.g., a bracket) and Printed Circuit Board (PCB) applied to a metal bezel of FIG. 12A according to another embodiment of the present invention.

FIG. 12B illustrates a structure of a secondary housing (e.g., a bracket) 1230 and PCB 1240 applied to the metal bezel 1210 of FIG. 12A according to an embodiment of the present invention.

Referring to FIG. 12B, the secondary housing (e.g., the bracket) 1230 including the PCB 1240 may be further disposed inside a metal bezel 1210. According to another embodiment of the present invention, the entirety of the secondary housing 1230 may be formed of a nonconductive member (e.g., synthetic resins), or may be assembled or insert-injected together with a metal member (e.g., a reinforcement plate 1231 for supporting a battery pack, an interface connector port 1241, etc.). In this case, the metal member 1231 may be disposed not to be in contact with the metal bezel 1210, or may be disposed to be electrically isolated from the metal bezel 1210 extending to a lateral side of the electronic device. The PCB 1240 may also be disposed to be electrically isolated from the metal bezel 1210, thereby being able to prevent the electric shock accident.

Figure 13:
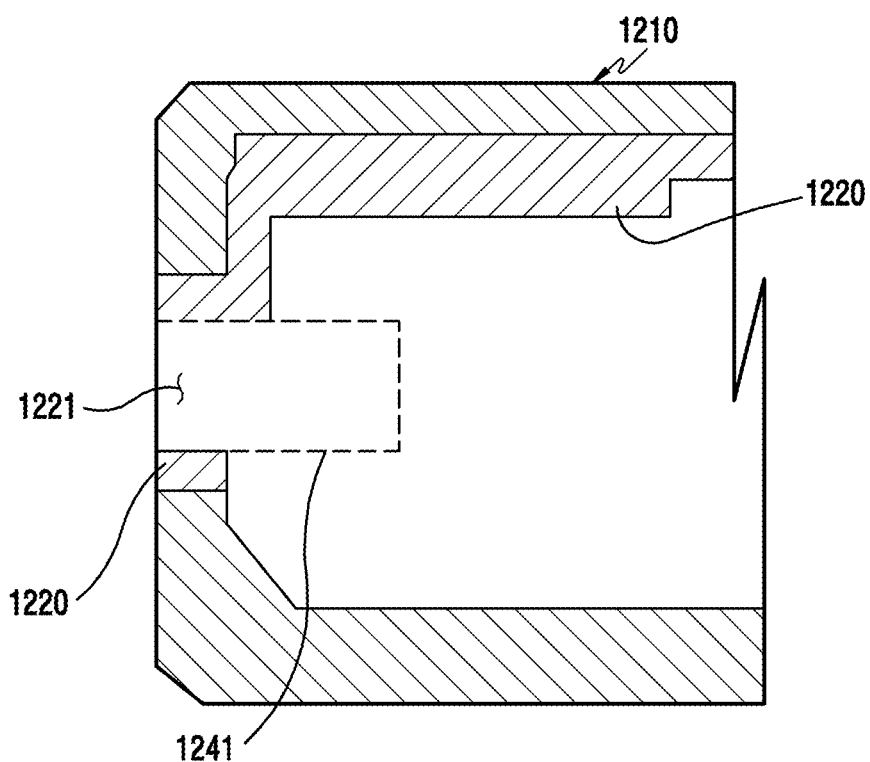
FIG. 13 is a cross-sectional view illustrating a state in which an interface connector port is applied to a metal bezel according to another embodiment of the present invention.

FIG. 13 is a cross-sectional view illustrating a state in which an interface connector port 1241 is applied to a metal bezel 1210 according to an embodiment of the present invention.

Referring to FIG. 13, a non-metal member 1220 may be injected through an opening 1221 for accommodating the interface connector port 1241 in order to electrically isolate the interface connection port 1241 and metal bezel 1210 formed with a metal material. Therefore, by the use of the non-metal member 1220 disposed around the interface connector port 1241, current which flows through the interface connector port 1241 may be prevented from causing an electric shock accident which may occur when current is applied to the metal bezel 1210.

According to various embodiments of the present invention, it is possible to provide a housing which can be configured to smoothly perform a function of an electronic device while reinforcing rigidity by using a structure of the housing itself and to have a good outer appearance, and an electronic device including the housing.

Figure 14:
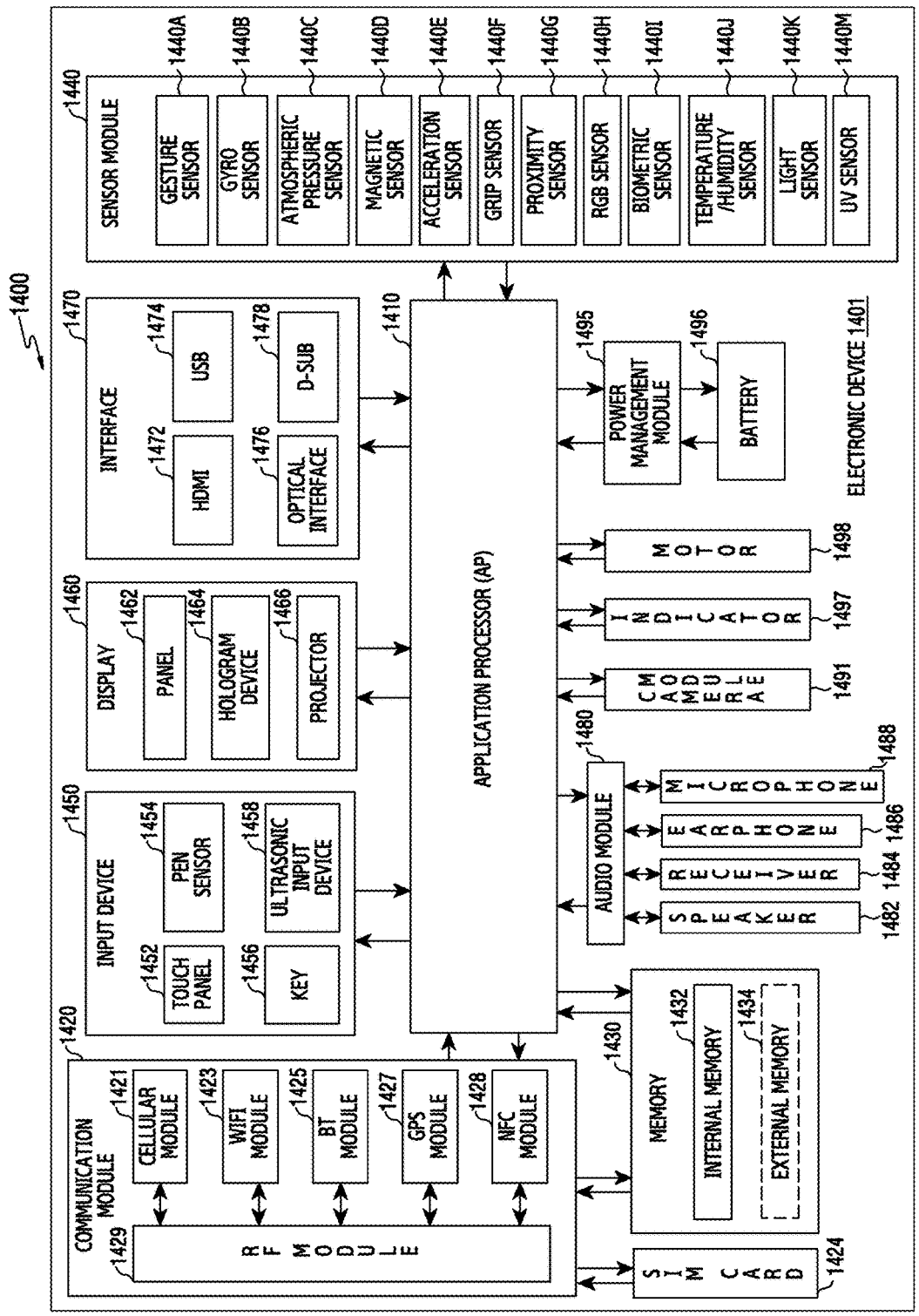
FIG. 14 is a block diagram of an electronic device according to an embodiment of the present invention.

FIG. 14 illustrates a block diagram 1400 of an electronic device 1401 according to an embodiment of the present invention. As shown in FIG. 14, the electronic device 1401 may entirely or partially constitute, for example, the electronic device 101 of FIG. 1. The electronic device 1401 includes at least one Application Processor (AP) 1410, a communication module 1420, a Subscriber Identification Module (SIM) card 1424, a memory 1430, a sensor module 1440, an input unit 1450, a display 1460, an interface 1470, an audio module 1480, a camera module 1491, a power management module 1495, a battery 1496, an indicator 1497, and a motor 1498.

The AP 1410 controls a plurality of hardware or software constitutional elements connected to the AP 1410 by driving an operating system or an application program, and processes a variety of data including multimedia data and performs an arithmetic operation. The AP 1410 may be implemented, for example, with a System on Chip (SoC). The AP 1410 may further include a Graphic Processing Unit (GPU).

The communication module 1420 (e.g., the communication interface 160) performs data transmission/reception in communications between other electronic devices (e.g., the electronic device 104 or the server 106) connected with the electronic device 1401 (e.g., the electronic device 101) through a network. The communication module 1420 may include a cellular module 1421, a Wi-Fi module 1423, a BT module 1425, a GPS module 1427, a NFC module 1428, and a Radio Frequency (RF) module 1429.

The cellular module 1421 provides a voice call, a video call, a text service, an internet service, and the like through a communication network (e.g., LTE, LTE-A, CDMA, WCDMA, UMTS, WiBro, GSM, etc.). In addition, the cellular module 1421 identifies and authenticates the electronic device within the communication network by using the SIM card 1424. The cellular module 1421 can perform at least some functions that can be provided by the AP 1410. For example, the cellular module 1421 may perform at least some of multimedia control functions.

In some embodiments, the cellular module 1421 may include a Communication Processor (CP). Further, the cellular module 1421 may be implemented, for example, with an SoC. Although constitutional elements such as the cellular module 1421 (e.g., the communication processor), the memory 1430, the power management module 1495, and the like are illustrated as separate constitutional elements with respect to the AP 1410 in FIG. 14, the AP 1410 can also be implemented such that at least one part (e.g., the cellular module 1421) of the aforementioned constitutional elements is included.

In some embodiments, the AP 1410 or the cellular module 1421 (e.g., the communication processor) loads an instruction or data, which is received from each non-volatile memory connected thereto or at least one of different constitutional elements, to a volatile memory and processes the instruction or data. In addition, the AP 1410 or the cellular module 1421 can store data, which is received from at least one of different constitutional elements or generated by at least one of different constitutional elements, into the non-volatile memory.

Each of the WiFi module 1423, the BT module 1425, the GPS module 1427, and the NFC module 828 may include, for example, a processor for processing data transmitted/received through a corresponding module. Although the cellular module 1421, the WiFi module 1423, the BT module 1425, the GPS module 1427, and the NFC module 828 are illustrated in FIG. 14 as separate blocks, according to an embodiment, at least some (e.g., two or more) of the cellular module 1421, the WiFi module 1423, the BT module 1425, the GPS module 1427, and the NFC module 1428 may be included in one Integrated Chip (IC) or IC package. For example, at least some of processors corresponding to the cellular module 1421, the WiFi module 1423, the BT module 1425, the GPS module 1427, and the NFC module 828 (e.g., a communication processor corresponding to the cellular module 1421 and a WiFi processor corresponding to the WiFi module 1423) may be implemented with an SoC.

The RF module 1429 serves to transmit/receive data, for example, to transmit/receive an RF signal. Although not shown, the RF module 1429 may include, for example, a transceiver, a Power Amp Module (PAM), a frequency filter, a Low Noise Amplifier (LNA), and the like. In addition, the RF module 1429 may further include a component for transmitting/receiving a radio wave on a free space in wireless communication, for example, a conductor, a conducting wire, and the like. Although it is illustrated in FIG. 14 that the cellular module 1421, the WiFi module 1423, the BT module 1425, the GPS module 1427, and the NFC module 1428 share one RF module 1429, according to an embodiment, at least one of the cellular module 1421, the WiFi module 1423, the BT module 1425, the GPS module 1427, the NFC module 1428 can transmit/receive an RF signal via a separate RF module.

The SIM card 1424 may be inserted to a slot formed at a specific location of the electronic device. The SIM card 1424 may include unique identification information (e.g., an Integrated Circuit Card IDentifier (ICCID)) or subscriber information (e.g., an International Mobile Subscriber Identity (IMSI)).

The memory 1430 (e.g., the memory 130) may include an internal memory 1432 or an external memory 1434. The internal memory 1432 may include, for example, at least one of a volatile memory (e.g., a Dynamic Random Access Memory (RAM) (DRAM), a Static RAM (SRAM), a Synchronous Dynamic RAM (SDRAM), etc.) or a non-volatile memory (e.g., a One Time Programmable Read Only Memory (ROM) (OTPROM), a Programmable ROM (PROM), an Erasable and Programmable ROM (EPROM), an Electrically Erasable and Programmable ROM (EEPROM), a Mask ROM, a Flash ROM, a NAND flash memory, a NOR flash memory, etc.).

The internal memory 1432 may be a Solid State Drive (SSD). The external memory 1434 may further include a flash drive, and may further include, for example, Compact Flash (CF), Secure Digital (SD), Micro Secure Digital (Micro-SD), Mini Secure digital (Mini-SD), extreme Digital (xD), memory stick, and the like. The external memory 1434 may be operatively coupled to the electronic device 1401 via various interfaces. The electronic device 1401 may further include a storage unit (or a storage medium) such as a hard drive.

The sensor module 1440 measures a physical quantity or detects an operation state of the electronic device 1401, and thus converts the measured or detected information into an electric signal. The sensor module 1440 may include, for example, at least one of a gesture sensor 1440A, a gyro sensor 1440B, a pressure sensor 1440C, a magnetic sensor 1440D, an acceleration sensor 1440E, a grip sensor 1440F, a proximity sensor 1440G, a color sensor 1440H (e.g., a Red, Green, Blue (RGB) sensor), a bio sensor 1440I, a temperature/humidity sensor 1440J, an illumination sensor 1440K, and an Ultra Violet (UV) sensor 1440M. Alternatively, the sensor module 1440 may include, for example, an E-node sensor, an ElectroMyoGraphy (EMG) sensor, an ElectroEncephaloGram (EEG) sensor, an ElectroCardioGram (ECG) sensor, a fingerprint sensor, etc. The sensor module 1440 may further include a control circuit for controlling at least one or more sensors included therein.

The input module 1450 may include a touch panel 1452, a (digital) pen sensor 1454, a key 1456, or an ultrasonic input unit 1458. The touch panel 1452 recognizes a touch input, for example, by using at least one of an electrostatic type, a pressure-sensitive type, and an ultrasonic type. The touch panel 1452 may further include a control circuit. In the case of the electrostatic type, not only a physical contact but also a proximity recognition is also possible. The touch penal 1452 may further include a tactile layer. In this case, the touch panel 1452 provides the user with a tactile reaction.

The (digital) pen sensor 1454 may be implemented, for example, by using the same or similar method of receiving a touch input of the user or by using an additional sheet for recognition. The key 1456 may be, for example, a physical button, an optical key, a keypad, or a touch key. The ultrasonic input unit 1458 is a device by which the electronic device 1401 detects a sound wave through a microphone (e.g., a microphone 1488) by using a pen which generates an ultrasonic signal, and is a device capable of radio recognition. The electronic device 1401 may use the communication module 1420 to receive a user input from an external device (e.g., a computer or a server) connected thereto.

The display 1460 (e.g., the display 150) may include a panel 1462, a hologram 1464, or a projector 1466. The panel 1462 may be, for example, a Liquid-Crystal Display (LCD), an Active-Matrix Organic Light-Emitting Diode (AMOLED), etc. The panel 1462 may be implemented, for example, in a flexible, transparent, or wearable manner. The panel 1462 may be constructed as one module with the touch panel 1452. The hologram 1464 uses an interference of light and show a stereoscopic image in the air. The projector 1466 displays an image by projecting a light beam onto a screen. The screen may be located, for example, inside or outside the electronic device 1401. The display 1460 may further include a control circuit for controlling the panel 1462, the hologram 1464, or the projector 1466.

The interface 1470 may include, for example, a High-Definition Multimedia Interface (HDMI) 1472, a Universal Serial Bus (USB) 1474, an optical communication interface 1476, or a D-subminiature (D-sub) 1478. The interface 1470 may be included, for example, in the communication interface 160 of FIG. 1. Alternatively, the interface 1470 may include, for example, Mobile High-definition Link (MHL0), Secure Digital (SD)/Multi-Media Card (MMC) or Infrared Data Association (IrDA).

The audio module 1480 bilaterally converts a sound and electric signal. At least some constitutional elements of the audio module 14014 may be included in, for example, the input/output interface 140 of FIG. 1. The audio module 1480 may convert sound information which is input or output, for example, through a speaker 1482, a receiver 1484, an earphone 1486, the microphone 1488, and the like.

The camera module 1491 is a device for image and video capturing, and according to an embodiment, may include one or more image sensors (e.g., a front sensor or a rear sensor), a lens, an Image Signal Processor (ISP), or a flash (e.g., Light Emitting Diode (LED) or xenon lamp).

The power management module 1495 manages power of the electronic device 1401. Although not shown, the power management module 1495 may include, for example, a Power Management Integrated Circuit (PMIC), a charger Integrated Circuit (IC), or a battery gauge.

The PMIC may be placed, for example, inside an IC or SoC semiconductor. Charging may be wired charging or wireless charging. The charger IC may charge a battery, and avoid an over-voltage or over-current flow from a charger. The charger IC may further include a charger IC for at least one of the wired charging and the wireless charging. The wireless charging may be classified, for example, into a magnetic resonance type, a magnetic induction type, and an electromagnetic type. An additional circuit for the wireless charging, for example, a coil loop, a resonant circuit, a rectifier, and the like, may be added.

The battery gauge may measure, for example, a residual quantity of the battery 1496 and a voltage, current, and temperature during charging. The battery 1496 may store or generate electricity, and supply power to the electronic device 1401 by using the stored or generated electricity. For example, the battery 1496 may include a rechargeable battery or a solar battery.

The indicator 1497 may indicate a specific state, for example, a booting state, a message state, a charging state, and the like, of the electronic device 1401 or a part thereof (e.g., the AP 1410). The motor 1498 may convert an electric signal into a mechanical vibration. Although not shown, the electronic device 1401 may include a processing unit (e.g., a GPU) for supporting mobile TV. The processing unit for supporting mobile TV may process media data according to a protocol of, for example, Digital Multimedia Broadcasting (DMB), Digital Video Broadcasting (DVB), media flow, and the like.

Each of the aforementioned constitutional elements of the electronic device according to various embodiments of the present invention can consist of one or more components, and names thereof can vary depending on a type of electronic device. The electronic device according to various embodiments of the present invention can include at least one of the aforementioned constitutional elements. Some of the constitutional elements can be omitted, or additional other constitutional elements can be further included. In addition, some of the constitutional elements of the electronic device according to various embodiments of the present invention can be combined and constructed as one entity, so as to equally perform functions of corresponding constitutional elements before combination.

According to various embodiments of the present invention, at least some parts of a device (e.g., modules or functions thereof) or method (e.g., operations) according to various embodiments of the present invention may be implemented with an instruction stored in a computer-readable storage media for example. If the instruction is executed by one or more processors (e.g., the processor 1410), the one or more processors may perform a function corresponding to the instruction. The computer-readable storage media may be, for example, the memory 1430. At least some parts of the programming module may be implemented (e.g., executed), for example, by the processor 1410. At least some parts of the programming module may include modules, programs, routines, sets of instructions, processes, and the like, for performing one or more functions.

The non-transitory computer readable recording medium may be a hardware device configured particularly to store and perform a program instruction (e.g., program module), for example, a hard disk, a magnetic medium such as a floppy disc and a magnetic tape, an optical storage medium such as a Compact Disc-ROM (CD-ROM) or a Digital Versatile Disc (DVD), a magnetic-optic medium such as a floptical disc, a Read Only Memory (ROM), a Random Access Memory (RAM), a flash memory, and the like. An example of the program instruction includes not only a machine language created by a compiler but also a high-level language executable by a computer by using an interpreter or the like. The aforementioned hardware device may be configured to operate as one or more software modules to perform the operation of the present invention, and the other way around is also possible.

The module or programming module according to various embodiments of the present invention may further include at least one or more constitutional elements among the aforementioned constitutional elements, or may omit some of them, or may further include additional other constitutional elements. Operations performed by a module, programming module, or other constitutional elements according to various embodiments of the present invention may be executed in a sequential, parallel, repetitive, or heuristic manner. In addition, some of the operations may be executed in a different order or may be omitted, or other operations may be added.

While the present invention has been shown and described with reference to certain embodiments thereof, it will be understood by those skilled in the art that various changes in form and details may be made therein without departing from the spirit and scope of the invention as defined by the appended claims. Therefore, the scope of the present invention is defined not by the detailed description of the present disclosure but by the appended claims and their equivalents, and all differences within the scope will be construed as being included in the present invention.

What is claimed is:

1. An electronic device comprising:
a housing forming at least a rear side and a lateral side of the electronic device; and
a display disposed to the housing to form at least a portion of a front side of the electronic device;
wherein the lateral side includes a metal member portion and a non-metal member portion, which is smaller in an area than the metal member portion;
wherein a non-transparent coating layer is formed on an outer surface of the lateral side and an outer surface of the rear side, and
wherein at least a part of the metal member portion is exposed to the outside, by removing the non-transparent coating layer, in at least one of a first boundary area between the lateral side and the front side, and a second boundary area between the lateral side and the rear side.

2. The electronic device of claim 1, wherein the non-metal member portion of the lateral side is hidden underneath the non-transparent coating layer.

3. The electronic device of claim 1, wherein at least one of the first boundary area and the second boundary area is formed in a curved shape.

4. The electronic device of claim 1, wherein at least one of the first boundary area and the second boundary area forms at least one chamfer portion formed in a lengthwise direction of the housing.

5. The electronic device of claim 1, wherein the at least a part without the non-transparent coating layer includes a processing area formed entirely along at least one of the first boundary area and the second boundary area.

6. The electronic device of claim 1, wherein the metal member portion is segmented by the non-metal member portion, wherein the segmented metal member portion forms an antenna radiator.

7. The electronic device of claim 1, wherein the non-metal member portion is inserted in a gap portion formed in the metal member portion.

8. The electronic device of claim 1, wherein the non-metal member portion comprises a first non-metal member portion and a second non-metal member portion.

9. The electronic device of claim 1, wherein the non-transparent coating layer comprises a primer layer on the outer surface and a paint layer on the primer layer.

10. The electronic device of claim 1, wherein the housing forms at least a portion of the front side extending from the first boundary area.

11. The electronic device of claim 1, wherein at least one of the first boundary area and the second boundary area has an angle or curvature different from the lateral side.

12. The electronic device of claim 1, wherein at least one of the first boundary area and the second boundary area forms a curved surface in an outer direction or inner direction of the housing.

13. The electronic device of claim 1, wherein the non-transparent coating layer was previously formed on the at least a part of at least one of the first boundary area and the second boundary area, and then removed from the at least a part by a cutting process or a milling process.

14. The electronic device of claim 1, wherein the at least one of the first boundary area and the second boundary area comprises a fairly narrow width compared with the lateral side.

* * * * *